(12) United States Patent
Berke et al.

(10) Patent No.: US 8,784,558 B2
(45) Date of Patent: Jul. 22, 2014

(54) ADMIXTURES FOR SHRINK CRACK REDUCTION OF PORTLAND CEMENT-BASED MORTARS AND CONCRETES

(75) Inventors: Neal Steven Berke, Chelmsford, MA (US); Glenn Eugene Schaefer, Portage, MI (US); Jerry Elliot Rademan, Jacksonville, FL (US); Ronald Wardle, Findlay, OH (US); Mark Shand, Findlay, OH (US)

(73) Assignee: Premier Magnesia, LLC, West Conshohocken, PA (US)

( * ) Notice: Subject to any disclaimer, the term of this patent is extended or adjusted under 35 U.S.C. 154(b) by 0 days.

(21) Appl. No.: 13/116,548

(22) Filed: May 26, 2011

(65) Prior Publication Data
US 2012/0298012 A1    Nov. 29, 2012

(51) Int. Cl.
| | | |
|---|---|---|
| C04B 2/00 | (2006.01) | |
| C08K 3/22 | (2006.01) | |
| C04B 20/10 | (2006.01) | |
| C04B 40/00 | (2006.01) | |
| C08L 33/00 | (2006.01) | |
| C04B 111/34 | (2006.01) | |
| C04B 103/56 | (2006.01) | |
| C08K 5/053 | (2006.01) | |

(52) U.S. Cl.
CPC . C08L 33/00 (2013.01); C08K 3/22 (2013.01); C04B 20/1022 (2013.01); C04B 40/0039 (2013.01); C04B 40/0042 (2013.01); C04B 2111/346 (2013.01); C04B 2103/58 (2013.01); C08K 5/053 (2013.01)
USPC ......................................................... 106/801

(58) Field of Classification Search
USPC .......................................................... 106/801
See application file for complete search history.

(56) References Cited

U.S. PATENT DOCUMENTS

| | | | |
|---|---|---|---|
| 3,211,566 A * | 10/1965 | Patton ........................... | 106/471 |
| 3,525,632 A | 8/1970 | Enoch et al. | |
| 3,717,600 A * | 2/1973 | Dalhuisen et al. ............ | 524/110 |
| 4,324,862 A * | 4/1982 | Gebler ........................... | 501/109 |
| 4,756,762 A * | 7/1988 | Weill et al. .................... | 106/691 |
| 4,772,326 A * | 9/1988 | Heinen et al. ................. | 106/645 |
| 4,786,328 A * | 11/1988 | Weill et al. .................... | 106/691 |
| 5,194,087 A * | 3/1993 | Berg ........................... | 106/18.12 |
| 5,571,319 A * | 11/1996 | Berke et al. ................... | 106/802 |
| 5,622,558 A * | 4/1997 | Berke et al. ................... | 106/802 |
| 5,925,699 A | 7/1999 | Ellenberger et al. | |

(Continued)

OTHER PUBLICATIONS

CN 101417884 A (Apr. 29, 2009) Gao abstract only-.*

(Continued)

*Primary Examiner* — Paul Marcantoni
(74) *Attorney, Agent, or Firm* — Brian J. Colandreo; Jeffrey T. Placker; Holland & Knight LLP

(57) ABSTRACT

Portland Cement-based concretes and mortars exhibit significant reduction in shrinkage cracking when combined with Magnesium Oxide (MgO), Shrinkage Reduction Admixtures (SRA) and Super Absorbent Polymers (SAP). However, MgO is a solid that reacts with water, SRA is a liquid, and SAP if not added properly could pull water out of the system and thus increase shrinkage. Unique admixture blends used as supplementary cementing materials that do not significantly affect concrete or cement strength properties of Portland cement itself address such issues. Proper ratios of MgO, SRA and/or SAP perform better against crack reduction when compared to commonly used Expansive Cements (EC).

18 Claims, 25 Drawing Sheets

(56) References Cited

U.S. PATENT DOCUMENTS

| | | | |
|---|---|---|---|
| 6,113,974 A * | 9/2000 | Winowiski et al. | 426/635 |
| 6,124,391 A | 9/2000 | Sun et al. | |
| 6,251,180 B1 * | 6/2001 | Engstrand et al. | 106/724 |
| 7,491,267 B2 * | 2/2009 | Francis et al. | 106/690 |
| 7,744,693 B2 * | 6/2010 | Mabey | 106/801 |
| 2006/0257643 A1 | 11/2006 | Birger | |
| 2007/0181039 A1 * | 8/2007 | Yamamoto et al. | 106/696 |
| 2010/0212892 A1 | 8/2010 | Santra et al. | |

OTHER PUBLICATIONS

JP 2001026489 A (Jan. 30, 2001) Kodama abstract only.*
KR 2006073705 A (Jun. 28, 2006) Cho et al. abstract only.*
JP 2007126294 A (Jun. 24, 2007) Masuda abstract only.*
JP 2007126294 A (Jun. 24, 2007) Masuda Machine Translation into English.*
CN 1584210 A (Feb. 23, 2005) Wang et al. abstract only.*
SU 920031 (Apr. 15, 1982) Danyushevskii et al. abstract only.*
Bentz et al., "On the Mitigation of Early Age Cracking," Sep. 24, 2012, International Seminar on Self-Desiccation III, Eds. B. Persson and G. Fagerlund, Lund, Sweden (2002)., http://ciks.cbt.nist.gov/-garbocz/lund004/, pp. 1-7.
International Search Report and Written Opinion received in International Application No. PCT/US2012/038943, Dated Oct. 26, 2012, pp. 1-5.
International Preliminary Report on Patentability issued in PCT application No. PCT/US2012/038943 on Mar. 25, 2014.

* cited by examiner

ADMIXTURES FOR SHRINK CRACK REDUCTION OF PORTLAND CEMENT-BASED MORTARS AND CONCRETES

BACKGROUND OF INVENTION

Solving a century's long concrete shrinkage cracking problem has been an elusive goal for cement technologists. When Portland cement formulations are mixed with water, they immediately begin a hydration reaction of powder with moisture evolving heat, cement matrix formation and curing that can take up to 28 days to form a 90+% cured concrete or mortar. During this curing process, the hydrated cement experiences shrinkage which often times lead to shrinkage cracking that can sometimes be minimal or other times prove catastrophic. This is especially critical when structural concrete is utilized for the construction of dams, waterways, water containment and treatment facilities, bridges, parking garages, stadiums, high rise buildings, etc. If cracks emerge, water (especially with deicing or marine salts) can penetrate and potentially cause premature corrosion of steel reinforcing bars, and if water leaks out of structures such as dams and waterways, there is a loss of efficiency and service life, and in the worst cases failures that can be catastrophic.

Magnesium oxides have been used in the field for improving crack resistance of portland cement concretes and mortars. An example of this is use is described in Du, Chonghang, *Concrete International*, December 2005, p. 45. by the Chinese. They used a lightly burnt type (<1200° C. burning temperature) of Magnesium Oxide for many concrete Dam projects throughout China in the late 1900's into early 2,000's. The use in dams was with low cementitious contents of about 180 to 220 kg/m$^3$. Typical structural concretes will have over 300 kg/m$^3$ of cementitious materials. Zhibin, Z. et al, SP-262-30, p. 395. performed some work with a high dosage of shrinkage reduction admixtures ("SRA") with cementitious content of 2% (by mass of cement) and 3% MgO. Though better results were obtained than by using SRA alone, wet expansion was high (greater than 0.1%) for the combinations. This could present a problem in constant wet storage. In addition, the SRA tested contained a siloxane, increasing the cost of the system.

Today, several concrete admixtures have been tried or used with some success. Materials previously tried are superplasticizers, expansion agents (calcium oxide, or expansive cements), shrinkage reduction admixtures usually glycol based products, different type pozzolans such as fly ash to partially replace the portland cement, and many other approaches.

A combination of MgO and CaO is discussed by Miao, C. et al, International RILEM *Conference on Use of Superabsorbent Polymers and Other New Additives in Concrete*, 15-18 Aug. 2010. They required approximately 10% addition of cementitious material to achieve good results. Furthermore, while early expansion was good, drying shrinkage still occurred. The use of CaO with a SRA is discussed by Maltese, C. et al, *Cement and Concrete Research* 35 (2005), p. 2244. They showed a decrease in shrinkage with combinations of CaO expansive agent and a SRA. The CaO used had 2% material retained on an 80-micron mesh, indicating that the CaO particles are larger than the cement particles. This will lead to unsightly CaO particles being visible. A finer composition, at the size of smaller cement particles, is too reactive, making its use not viable.

The use of SRA, based on various polymeric glycols, have been practiced for the last three plus decades to reduce the risk of shrinkage cracking of many concrete structures The believed mechanism by which SRA's operate is that when excess water begins to evaporate from the concrete's surface after placing, compacting, finishing and curing; an air/water interface or "meniscus" is set up within the capillaries or pores of the cement paste of the concrete. Because water has a very high surface tension, this causes a stress to be exerted on the internal walls of the capillaries or pores where the meniscus has formed. This stress is in the form of an inward pulling force that tends to close up the capillary or pore. Thus the volume of the capillary is reduced leading to shrinkage of the cement paste around the aggregates, leading to an overall reduction in volume. SRA's therefore, are believed to operate by interfering with the surface chemistry of the air/water interface within the capillary or pore, reducing surface tension effects and consequently reducing the shrinkage as water evaporates from within the concrete. It has also been reported by others, that SRA's might mitigate plastic and autogenous volume changes. SRA's are relatively expensive, so their usage levels in the field are generally at or below a 2% level, based on the cement binder concentration. Higher concentrations provide only marginally less shrinkage, not justifying the higher costs, and often lead to excess retardation (increased time for the concrete to harden and develop strength) which is unacceptable. Performance is almost linear up to 2%, but under demanding situations, the low addition rates will not provide enough shrinkage reduction to prevent cracking. In addition to the patents listed, there are several articles in the literature on the effectiveness of SRAs in reducing shrinkage in cementitious systems. A good overview was given by Sant, G. et al, *International RILEM Conference on Use of Superabsorbent Polymers and Other New Additives in Concrete*, 15-18 Aug. 2010.

Jensen, O. and Hansen, P. F., Cement and Concrete Research, Vol. 31, No. 4 (2001), p. 647; Igarashi, S. et al, *International RILEM Conference on Use of Superabsorbent Polymers and Other New Additives in Concrete*, 15-18 Aug. 2010; Ribero, A. et al, *International RILEM Conference on Use of Superabsorbent Polymers and Other New Additives in Concrete*, 15-18 Aug. 2010; and Craeye, B. et al, *Construction and Building Materials*, 25 (2011), p. 1, represent several of the many references on the performance of Super Absorbent Polymers ("SAP") when used in concrete formulations. These articles show that SAPs are effective in controlling internal desiccation of cementitious materials with low water to cement ratios, that is reduce autogenous shrinkage. These SAP materials are very expensive (compared to other concrete additives) and are cost prohibitive when used at the levels found to be effective earlier. The cited SAP's are based on various polyacrylics and polyacrylamides, mono or copolymers. Other known SAP's are based on various cellulosics, fiber based materials, starches, polyacrylonitrile, polyvinyl alcohols, carboxymethyl cellulose, and isobutylene maleic anhydride.

SAPs provide additional water to balance the water lost to hydration of the cementitious components that can't be replaced from external water due to the low permeability of these materials. At higher water contents the need for extra water is less and these materials could potentially pull water out of the matrix. In addition, they do not provide enough water to offset moisture loss at higher permeability.

A novel and synergistic approach of blending shrinkage reduction admixtures ("SRAs") with light-burnt and reactive magnesium oxide as expansion additives, along with the use of various super absorbent polymers; for improving many types of portland cement based concretes and mortars is disclosed. Superplasticizers are also found to be helpful when water reducing properties are required. MgO is less reactive than CaO and thus can be used in smaller particle sizes that do not adversely affect early setting or appearance. In addition, an unexpected synergy was found when SAPs were added to the combination of MgO and SRA. The combination synergies result in good shrinkage performance when the MgO level is at or less than 3% by mass of cementitious material and the SRA is less than 1.5% by mass of the cementitious materials present. This reduces the risk of expansion stresses that can cause cracking, and reduces the cost of a higher 2% or more dosage of SRA, as well as a reduction in strength of the admixture at higher SRA doses.

It is known that a liquid can be absorbed onto fine particles to have a free flowing dry powder. In the case of applying SRA to MgO ratios are needed that will result in a maximum dosage of about 6% MgO and a range of SRA from about 0.5 to 2% of the cementitious admixture by mass on cementitious. This requires a SRA percentage of the MgO from about 10 to 30%. The MgO has an average particle size of approximately 18 µm, making it on the order of some coarser cements. Cements will not absorb more than 3-5% of the SRA and still be flowable powder and not partially like a liquid. U.S. Pat. No. 6,648,962 shows that a hydrated cement can be crushed and act as a carrier for an SRA. But, this is a commercially more costly route, and unlike the MgO it offers no synergies on shrinkage/crack reduction. Other materials with high surface area, such as silica fume or metakaolin, can absorb the SRA, but offset some of the benefits of the SRA, and the combinations can significantly reduce workability of the mortar or concrete. Silica fume has another negative in that it darkens the mortar or concrete, which adversely affects its appearance. Expansive cements could potentially be used, but they typically require dosages of about 12% cement and require substantially more processing and cost to produce than the MgO used here. CaO can potentially work, but in the particle size range needed to prevent rapid expansion and heat generation, the light colored particles are highly visible on the surface of the mortar or concrete.

In this invention novel combinations of MgO with a liquid SRA to produce a stable flowing powder that allows for the application of the MgO and SRA together without the need for a liquid dispenser for the SRA. Optimum ratios for performance in cementitious systems as well as product stability were determined.

DESCRIPTION OF PREFERRED EMBODIMENTS

Figure 1:
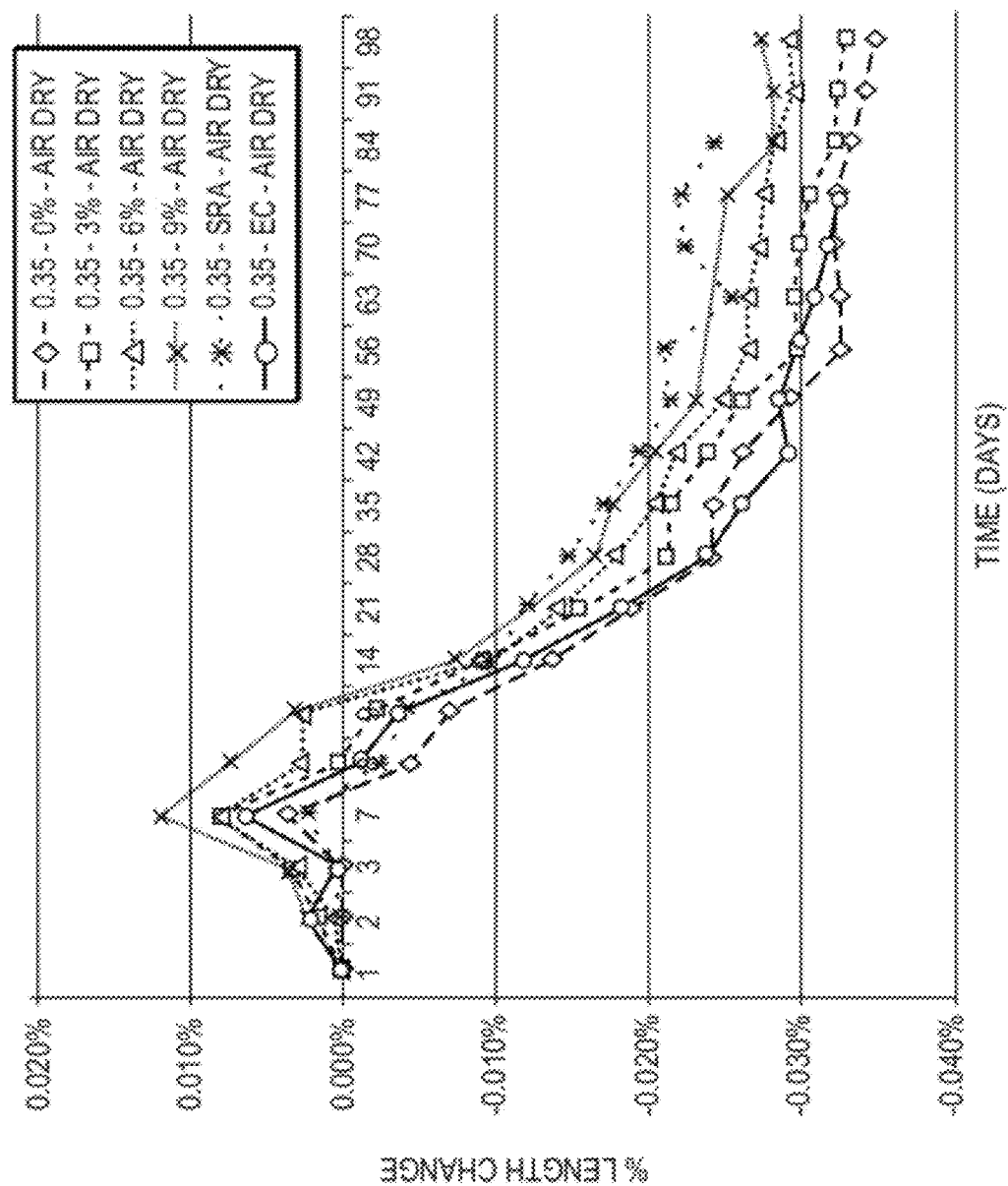
FIG. 1 is a graph showing drying shrinkage data for mixtures at 0.35 w/cm.

All parts and percentages of components describe herein are by mass unless otherwise indicated. The term "s/s" means mass of solid additive based on mass of hydraulic cement or cementitious binder.

Embodiments of the present invention include combinations of MgO with a SRA, such as in a liquid form, to produce a stable flowing powder that allows for the application of the MgO and SRA together without the need for a liquid dispenser for the SRA. Optimum ratios for performance of embodiments of cementitious admixtures in accordance with the present invention, as well as product stability were determined. As previously summarized, exemplary admixtures for shrink crack reduction in accordance with the present invention comprise: (i) a lightly burnt MgO expansive powder; and (ii) a shrinkage reduction admixture ("SRA"). Preferred compositions may further comprise (iii) a superabsorbent polymer ("SAP").

The exemplary admixtures for shrink crack reduction can be introduced, either in dry powder, or a combination of dry powder and wet form, into conventional grouts, mortars, and concretes to reduce shrinkage and shrinkage induced cracking after hardening.

A preferred way to add (i) MgO and (ii) the SRA, which is usually a liquid at room temperature, is to mix the SRA into the MgO to have a dry powder. Exemplary ranges by mass for such a mixture are 7% to 25% of SRA to the amount of MgO. A more preferred range would be a range of 17.5% to 25% of SRA to the amount of MgO.

The addition of a (iii) SAP to (i) MgO and (ii) SRA provides further improvements. An exemplary range of SAP is between 0% and 7% of the amount of MgO. At water-tocementitious ratios less than or equal to 0.38 a more preferred range is 0.1% to 12% of the MgO.

The SAP component (iii) can be added dry, alone, or blended into the (i) MgO or more preferably in the mixture of (i) MgO and (ii) SRA dry powder.

The SAP can also be added by, for example, combining it with the SRA to have either a gel type dry additive or a liquid.

The exemplary (i) MgO is produced by heating magnesium carbonate to a temperature in the range of approximately between 750 to 1200° C. The exemplary (i) MgO has a mean particle size in the range of approximately between 10 and 20 micrometers. This size range tends to minimize adverse effects on workability of the admixture, while still having a large surface area.

The exemplary (ii) SRAs suitable for use in embodiments of the present invention include SRAs, such as disclosed in U.S. Pat. Nos. 5,556,460, 5,618,344, 5,779,788, 5,603,760, 5,622,558, and 6,277,191. A preferred SRA is an alkylene glycol represented by the general formula HOBOH wherein B represents a C3-C12 alkylene group, preferably a C5-C8 alkylene group. Examples of such glycols are 1,6-hexanediol, 1,5-pentanediol, 1,4-pentanediol, 2-methyl-2,4-pentanediol and the like. As another example, an exemplary SRA may be a diol such as a secondary and/or tertiary dihydroxy C3-C8 alkane represented by the formula:

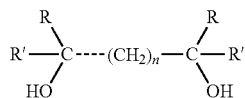

Wherein each R independently represents a hydrogen atom or a C1-C2 alkyl group, each R' represents a C1-C2 alkyl group, and n represents an integer or 1 or 2. Of the diol-based SRAs, the most preferred is 2-methyl-2,4-pentadiol, which is sometimes referred to as "hexylene glycol" ("HG").

Alkylene glycols believed to be useful for use in embodiments of the present invention and can include, for example, condensed alkylene glycols represented by the formula HO(AO)xH wherein A represents a propylene and more preferably an ethylene or methylene; 0 represents an oxygen atom and x is an integer in the range of approximately 1 to 10, provided the diol is soluble in water. The AO group in a particular glycol molecule may all be the same or different. Examples of such glycols include diethylene glycol, dipropylene glycol, tripropylene glycol, di(oxyethylene)di(oxypropylene)glycol as well as poly(oxyalkylene)glycols. The AO groups of such polyoxyalkylene glycols may be of single alkylene or a mixture of alkylene groups which are either block or random configuration.

Examples of SAP (iii) that can be used in embodiments of the present invention can be a cellulosic, fiber-based materials, starches, polyacrylonitrile, polyvinyl alcohols, carboxymethyl cellulose, isobutylene maleic anhydride, polyacrylics, polyacrylamides used alone or as co- or tertiary polymers. It can be either a solid or liquid or part of an emulsion. Preferred SAPs (iii) can be crosslinked acrylic-acrylamide copolymers neutralized with potassium, magnesium or other alkali earth metals. When in solid form the preferred particle size for the SAPs can be in the range of approximately 75 to 2000 μm.

When the MgO (i) and SRA (ii) are combined solid forms, a preferred form of the SAP (iii) is as a solid.

Embodiments of the admixture combination in accordance with the present invention provide reduced shrinkage in cementitious matrixes. This is also the case with cementitious matrixes that include additives to repel the ingress of water and moisture.

Exemplary additions by mass of the cement admixture are as follows:

| Component | Range (% on Cementitious) | Preferred Range (% on Cementitious) |
|---|---|---|
| MgO (i) | 3 to 7.5 | 3.75 to 6 |
| SRA (ii) | 0.5 to 2.0 | 0.5 to 1.75 |
| SAP (iii) | 0 to 0.4 | 0 to 0.2 |

Exemplary additions by mass of the cement admixture when the water-to-cementitious ratio is at or below, for example, 0.38 are as follows:

| Component | Range (% on Cementitious) | Preferred Range (% on Cementitious) |
|---|---|---|
| MgO (i) | 3 to 7.5 | 3.75 to 6 |
| SRA (ii) | 0.5 to 2.0 | 0.5 to 1.75 |
| SAP (iii) | 0 to 0.4 | 0.1 to 0.3 |

Exemplary water repelling additives that can be used in embodiments of the present invention include calcium or butyl stearates or oleates, polymer stearates, potassium methyl siliconate, and organo-silane derivatives. The water-to-binder (-cementitious) ratio in exemplary embodiments of the present invention an advantageously be in the range of approximately between 0.20 to 0.65. All of the components help to offset shrinkage at the lower ratios, and at the higher ratios deleterious expansions over 0.1% in 28 days of moisture exposure for mortars or 0.04% of moisture induced expansion for concretes are not exceeded.

Other expansion products can be used with the MgO. Preferred materials are CaO, calcium silicate, and magnesium silicate.

An exemplary use of embodiments of the present invention include uses in grouts, mortars and concretes used in construction with a most preferred use in steel reinforced structural concretes.

An exemplary use of embodiments of the presents invention include uses as an additive to concrete ready mixes, concrete admixtures added during field use, pre-packaged concrete repair mortars and in grout and mortars either premixed or added as an admixture.

Additional exemplary uses of embodiments of the present invention include uses in the grouts, mortars and concretes containing latexes to improve bond or reduce permeability.

An exemplary use of the dry flowable powder useable in embodiments of the present invention include as an additive to concrete ready mixes and pre-packaged concrete repair mortars and in grout and mortars either premixed or added as an admixture when latex is present.

Another exemplary use of embodiments of the present invention include a use to reduce or eliminate autogenous deformation properties of cementitious products made using formulated cement and concrete formulations.

An exemplary application of embodiments of the present invention includes using the admixture to increase the distance between control joints by as much as 2 to 3 times the normal distance between joints.

A further exemplary use of embodiments of the present invention includes using the admixture with water reducing and superplasticizing admixtures. Exemplary water reducers and superplasticizers include modified lignosulfonates, polycarboxylate derivatives, sulfonated melamine-formaldehyde condensates, and sulfonated naphthalene-formaldehyde condensates.

An exemplary product utilizing embodiments of the present invention include a dry flowable MgO (i) and SRA (ii) product that is stable and can be used as an additive to grout, mortar or concrete mixtures, or be added to prepackaged formulated products. An exemplary useful range for the dry flowable MgO and SRA is approximately 7% to 30% SRA by mass of the MgO. A more preferred range for the dry flowable MgO and SRA is 13% to 25% SRA by mass of the MgO. The most preferred range for the dry flowable MgO and SRA is 17.5% to 25% SRA by mass of MgO.

An exemplary dry powder in accordance with the present invention includes a flowing combination of MgO and SRA to which 0% to 7% by mass of dry SAP is mixed based on the MgO content. An exemplary dry powder for water-to-cementitious ratios less than or equal to 0.38% is 2 to 7% by mass of dry SAP is added based on the MgO content.

EXAMPLE 1

Use of MgO or SRA independently to demonstrate deficiencies addressed by embodiments of the present invention.

Figure 2:
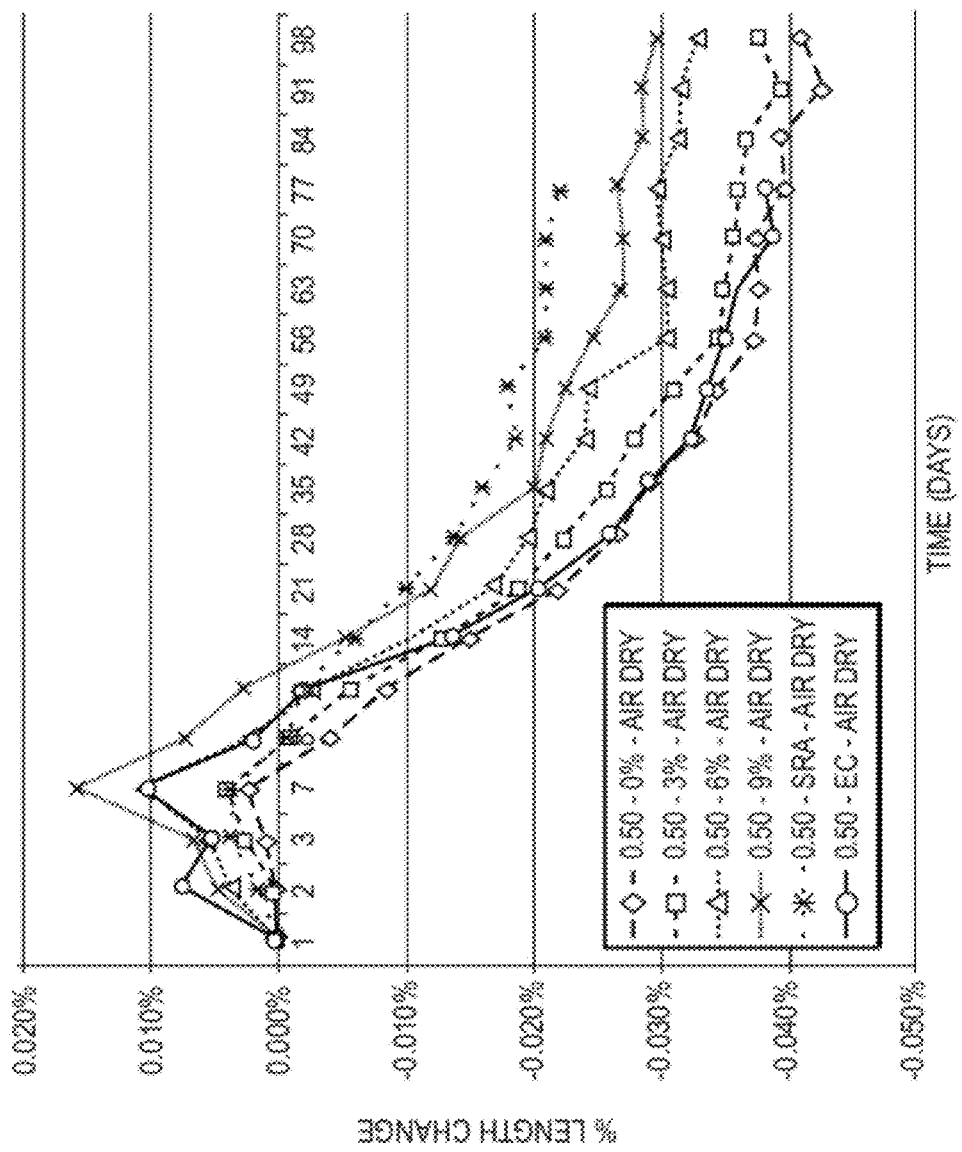
FIG. 2 is a graph showing drying shrinkage for mixtures at 0.50 w/cm.
Figure 3:
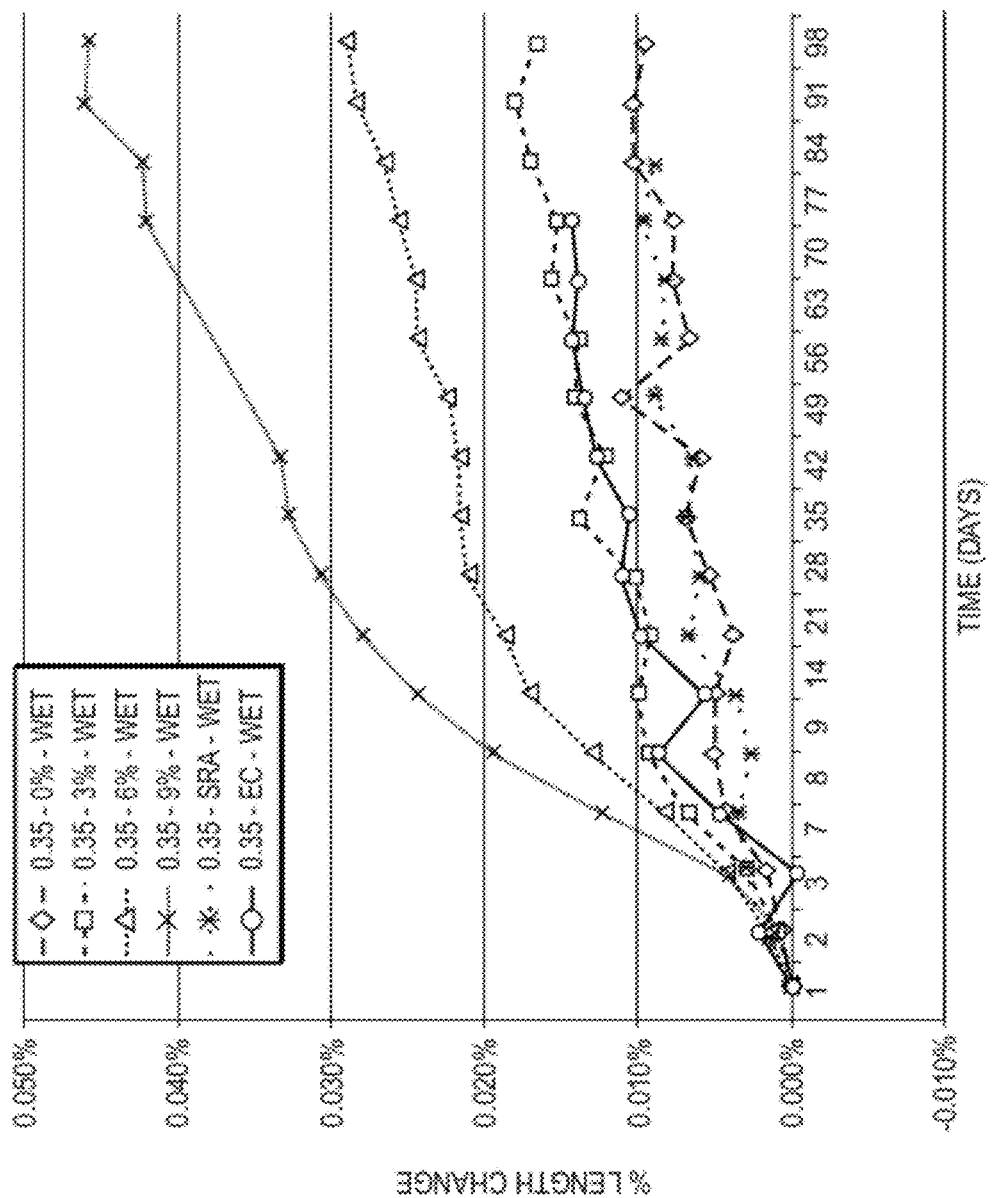
FIG. 3 is a graph showing wet expansion for mixtures at 0.35 w/cm.
Figure 4:
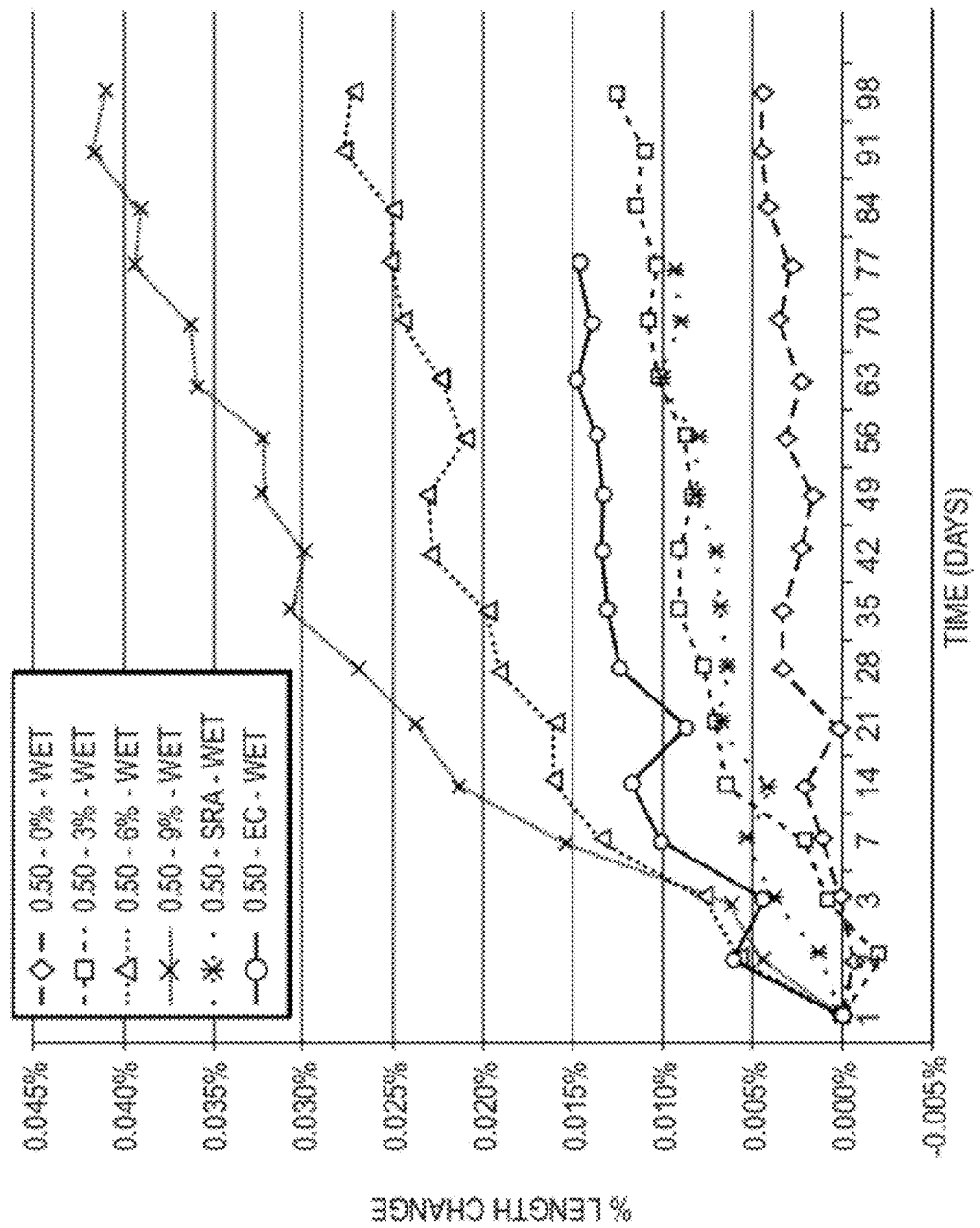
FIG. 4 is a graph showing wet expansion for mixtures at 0.50 w/cm.

Table 1 shows concrete mixture proportions for mixtures containing MgO, expansive cement (EC), or shrinkage reducing admixture (SRA) as well as the plastic concrete properties. FIGS. 1 and 2 show the shrinkage behavior for a short water cure followed by air drying following the procedure in accordance ASTM C 157, for the 0.35 water-to-cementitious ratio (w/cm) and 0.5 w/cm concretes. FIGS. 3 and 4 show the expansion for the 0.35 w/cm and 0.5 w/cm concretes under constant wet conditions.

TABLE 1

Background concrete mixtures with MgO, Expansive Cement (EC), or Shrinkage Reducing Admixture (SRA)

| Designation | Portland Cement (pcy) | MgO (pcy) | EC (pcy) | SRA (gpy) | w/cm | Avg. Slump (in.) | Avg. Air (%) | Avg. Unit Weight (pcf) |
| --- | --- | --- | --- | --- | --- | --- | --- | --- |
| 50-0 | 564 | 0 | 0 | 0 | 0.5 | 6.2 | 6.2 | 142.3 |
| 50-3 | 547 | 17 | 0 | 0 | 0.5 | 5.8 | 6.1 | 142.0 |
| 50-6 | 531 | 33 | 0 | 0 | 0.5 | 5.6 | 6.0 | 142.3 |
| 50-9 | 513 | 51 | 0 | 0 | 0.5 | 4.7 | 6.0 | 142.2 |
| 50-EC | 484 | 0 | 80 | 0 | 0.5 | 6.1 | 6.8 | 141.7 |
| 50-SRA | 564 | 0 | 0 | 1 | 0.5 | 5.2 | 5.9 | 142.9 |
| 35-0 | 638 | 0 | 0 | 0 | 0.35 | 5.4 | 6.4 | 144.9 |
| 35-3 | 619 | 19 | 0 | 0 | 0.35 | 5.0 | 6.2 | 146.9 |
| 35-6 | 600 | 38 | 0 | 0 | 0.35 | 5.2 | 6.1 | 144.9 |
| 35-9 | 581 | 57 | 0 | 0 | 0.35 | 4.1 | 6.4 | 145.0 |
| 35-EC | 558 | 0 | 80 | 0 | 0.35 | 5.3 | 6.6 | 144.0 |
| 35-SRA | 638 | 0 | 0 | 1 | 0.35 | 8.1 | 6.9 | 143.6 |

Notes:
Coarse Aggregate = 1780 pcy for all mixtures, Sand = 1190 pcy at 0.50 w/cm. Sand = 1256 pcy at 0.35 w/cm.
All mixtures had BASF MB-AE 90 for air entrainment. 0.35 w/cm mixtures used BASF Guinium ® 3030 superplasticizer.
Pcy = lbs./cubic yard;
gpy = gallons/cubic yard,
pcf = lbs./cubic foot.

ASTM C 1551Ring tests results are shown in Table 2. Good performance (90 days without cracking) was obtained with the 6% MgO contents at 0.5 w/cm, but 9% MgO was needed at 0.35 w/cm to reach 90 days without cracking

TABLE 2

Background concrete mixtures ASTM C 1551 Shrinkage Ring Time to Cracking (days) with and without MgO.

| Designation | Ring 1 | Ring 2 | Ring 3 | Average |
| --- | --- | --- | --- | --- |
| 50-0 | 24.3 | 29.6 | 27.0 | 27.0 |
| 50-3 | 75.4 | 70.9 | n/a | 73.1 |
| 50-6 | >123 | >123 | >123 | >123 |
| 35-0 | 13.6 | 15.4 | 21.9 | 16.9 |
| 35-3 | 21.0 | 19.5 | 12.9 | 17.8 |
| 35-6 | 18.3 | 15.7 | 22.4 | 18.8 |
| 35-9 | >129 | >129 | >129 | >129 |

The results of this testing showed that the use MgO was not able to safely control drying shrinkage as used outside of embodiments of the present invention. MgO was very effective in reducing drying shrinkage due to its expanding when reacting in a cementitious material. However, MgO levels above 6% might result in cracking from the expansion as demonstrated by expansion values above 0.04% in FIGS. 3 and 4. While early expansions above 0.04% within a day are desirable in a sealed system to prevent large voids, in a concrete or mortar exposed to the moist environments if this degree of expansion occurs after 1 day it can lead to cracking. At levels of MgO that would result in less ultimate expansion when continuously exposed to outside moisture the drying shrinkage performance dropped. Thus a means of improving performance at lower addition levels of MgO is preferable.

EXAMPLE 2

Figure 5:
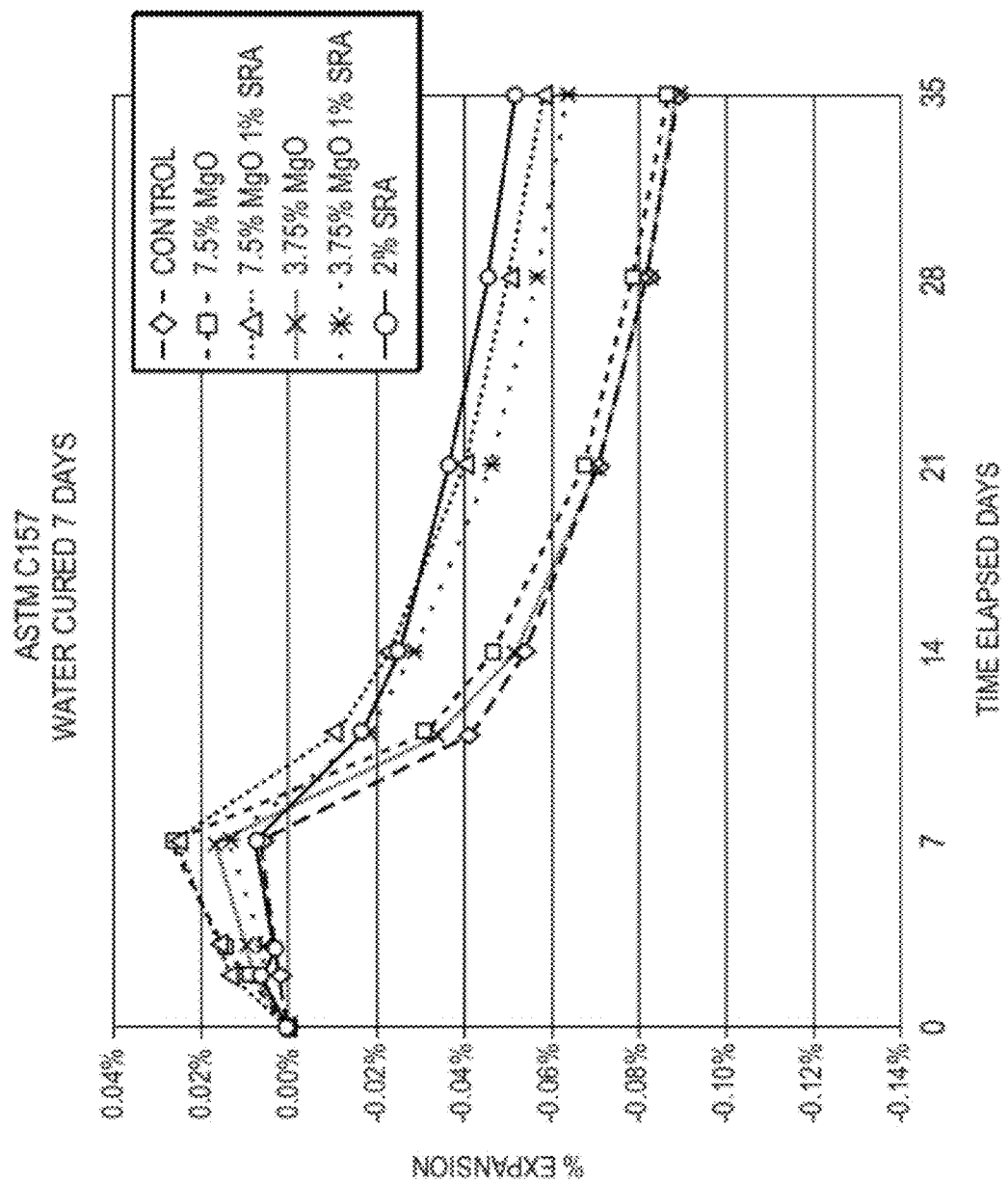
FIG. 5 is a graph showing moist cured drying shrinkage for mortars in Table 3.
Figure 6:
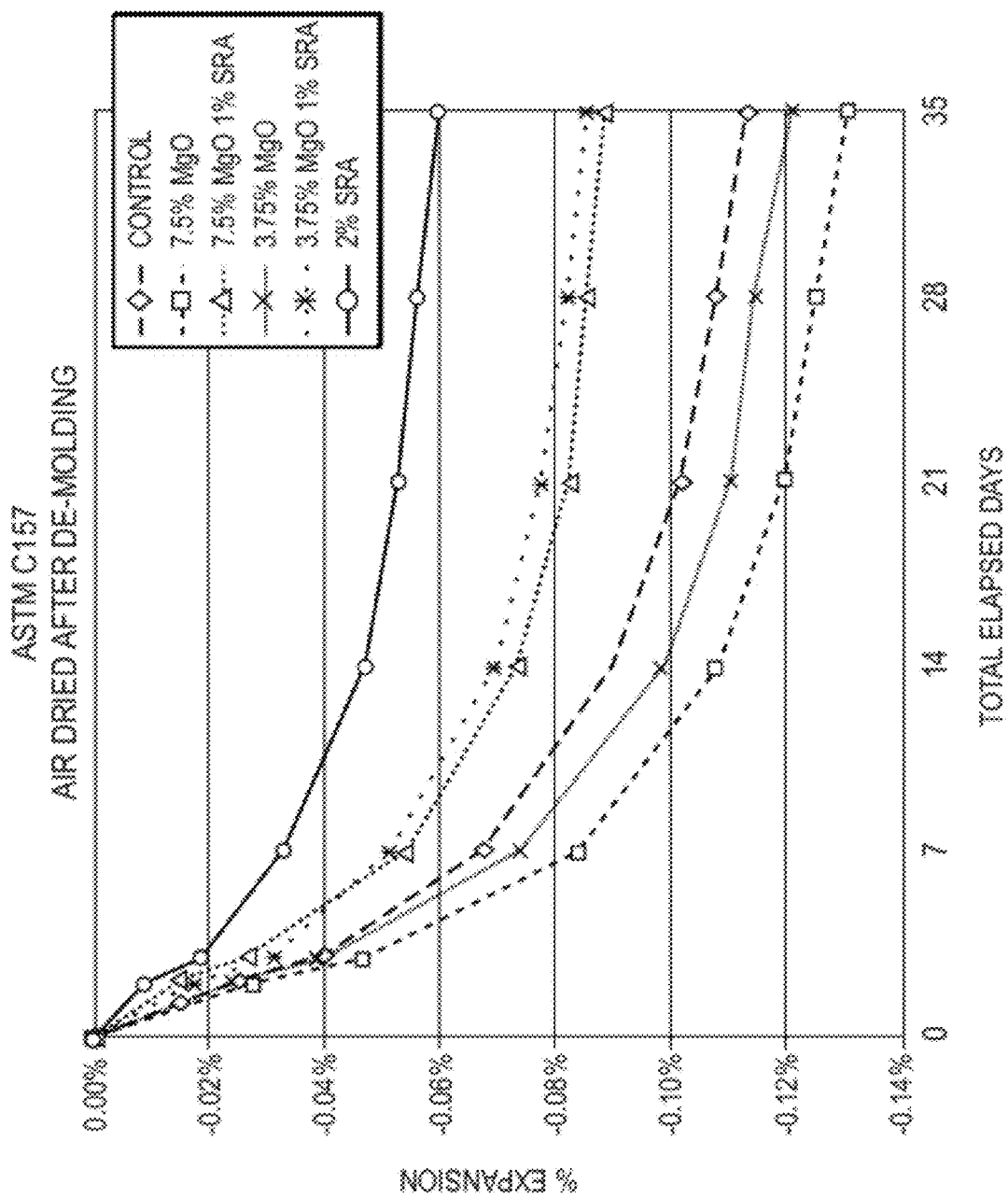
FIG. 6 is a graph showing drying shrinkage for mortars in Table 3.

Admixtures in accordance with the present invention were tested. The testing was conducted to demonstrate the performance of MgO with and without combinations of SRA. The base mortar formulas used were at an intermediate w/cm=0.43 as the two used in the previous concrete testing, using MgO by itself. The results of this experiment are as follows:

Table 3 gives the mortar mixture design for MgO and SRA added alone and combined. FIG. 5 shows the ASTM C 157 shrinkage results for one week of wet curing, and then drying in air, FIG. 6 shows the shrinkage results for only one day of curing and then drying in air (most severe drying conditions).

TABLE 3

Mortars with/without MgO or SRA, w/cm = 0.43, Cement:Sand = 1:2.6

| Mix # | MgO (%) | SRA (%) |
| --- | --- | --- |
| 1 (Ref.) | 0 | 0 |
| 2 | 7.5 | 0 |
| 5 | 7.5 | 1 |
| 8 | 3.75 | 0 |
| 11 | 3.75 | 1 |
| 16 | 0 | 2 |

Notes:
MgO—Premier 93HR, SRA—Commercial glycol based product. Rheobuild 1000 (NFS based) superplasticizer was used to adjust flow.

The data show that there was little to no improvement in drying shrinkage with MgO alone at the doses used, but in embodiments of the present invention the admixture with combined MgO and only 1% SRA of cementitious, gave almost the same performance as 2% SRA by mass of cement. This is a significant unexpected synergy.

EXAMPLE 3

Figure 7:
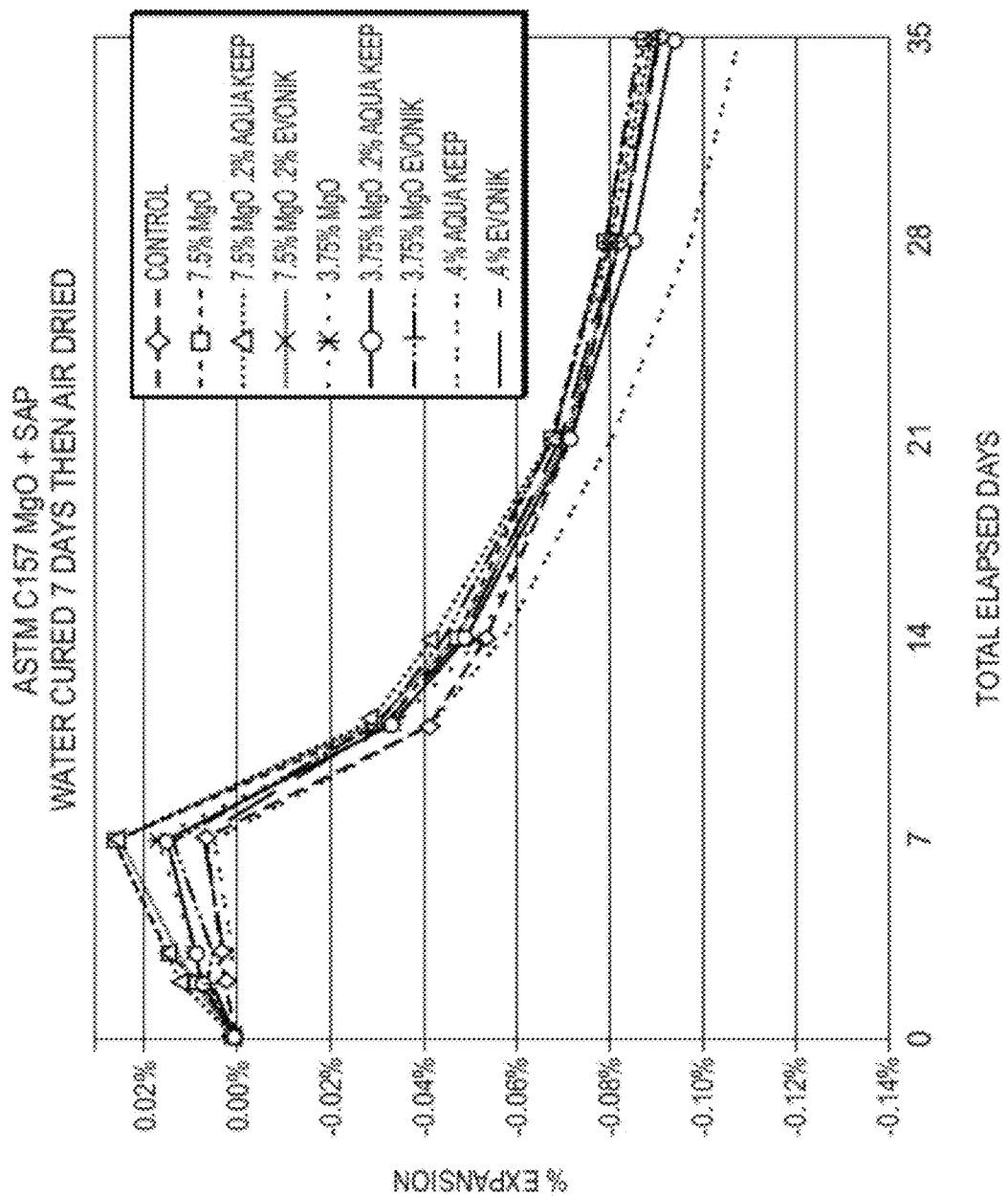
FIG. 7 is a graph showing moist cured drying shrinkage for mortars in Table 4.
Figure 8:
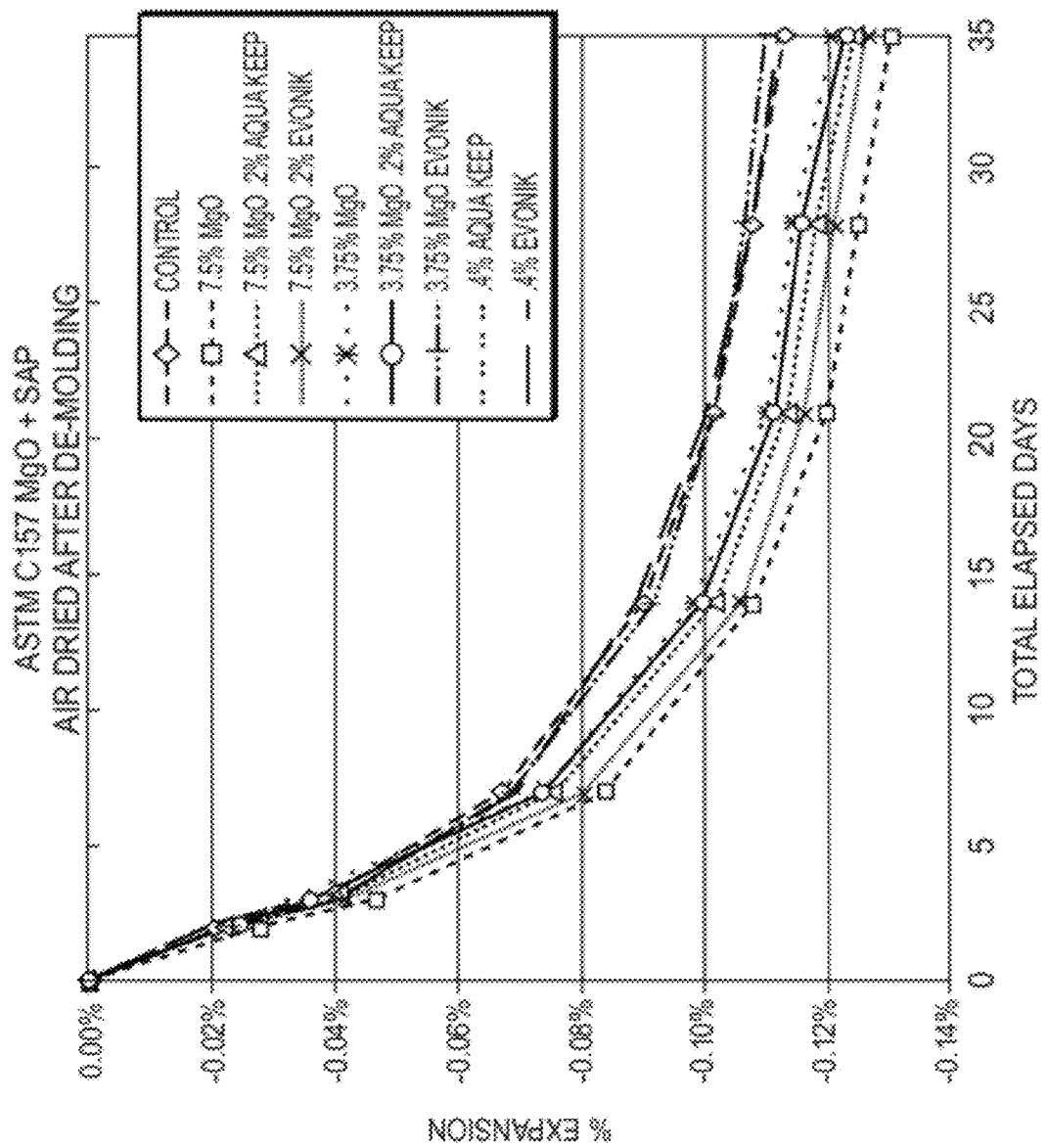
FIG. 8 is a graph showing drying shrinkage for mortars in Table 4.

SAP materials may be useful in shrinkage crack reduction. Two SAP materials were evaluated. The results are as follows:

Table 4 uses the same MgO mortars as in Table 3 with two different SAP materials being tested in place of the SRA. FIGS. 7 and 8 give the drying shrinkage results for moist curing and air drying and air drying alone. Unlike the SRA, the SAP did not have a significant positive effect on shrinkage performance.

TABLE 4

Mortars with/without MgO or SAP, w/cm = 0.43, Cement:Sand = 1:2.6

| Mix # | MgO (%) | SAP (%) | SRA (%) |
|---|---|---|---|
| 1 (Ref.) | 0 | 0 | 0 |
| 2 | 7.5 | 0 | 0 |
| 3 | 7.5 | 0.2 (SAP #1 | 0 |
| 4 | 7.5 | 0.2 (SAP#2) | 0 |
| 8 | 3.75 | 0 | 0 |
| 9 | 3.75 | 0.2 (SAP #1) | 0 |
| 10 | 3.75 | 0.2 (SAP #2) | 0 |
| 14 | 0 | 0.4 (SAP#1) | 0 |
| 15 | 0 | 0.4 (SAP#2) | 0 |
| 17 (Rept#6) | 3.75 | 0.2 (SAP#1) | 1 |

Notes:
MgO—Premier 93HR, SAP#1—Aqua Keep, SAP#2—Evonik Agricultural. Rheobuild 1000 (NFS based) superplasticizer was used to adjust flow.

EXAMPLE 4

Figure 9:
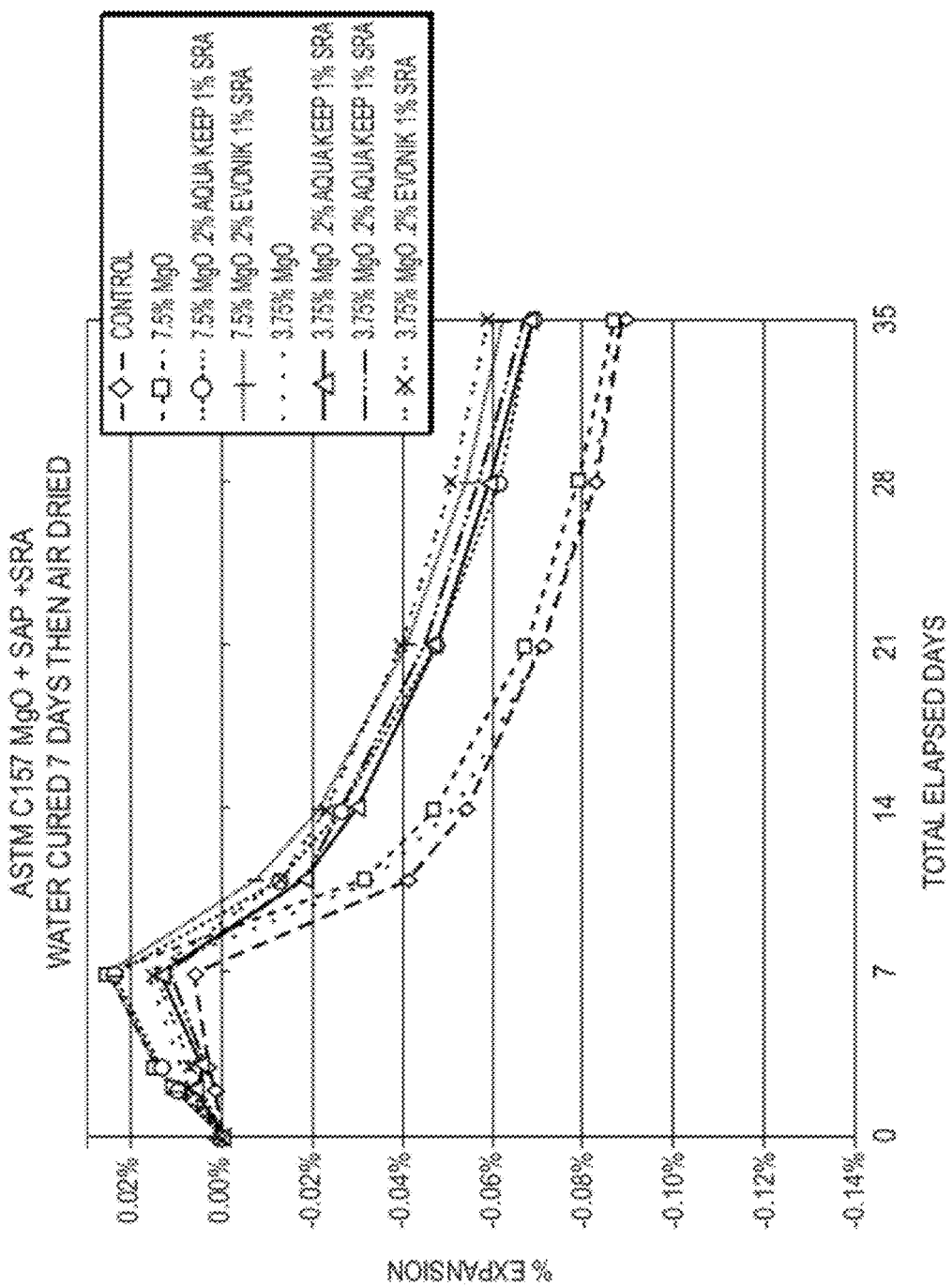
FIG. 9 is a graph showing moist cured drying shrinkage for mortars in Table 5.
Figure 10:
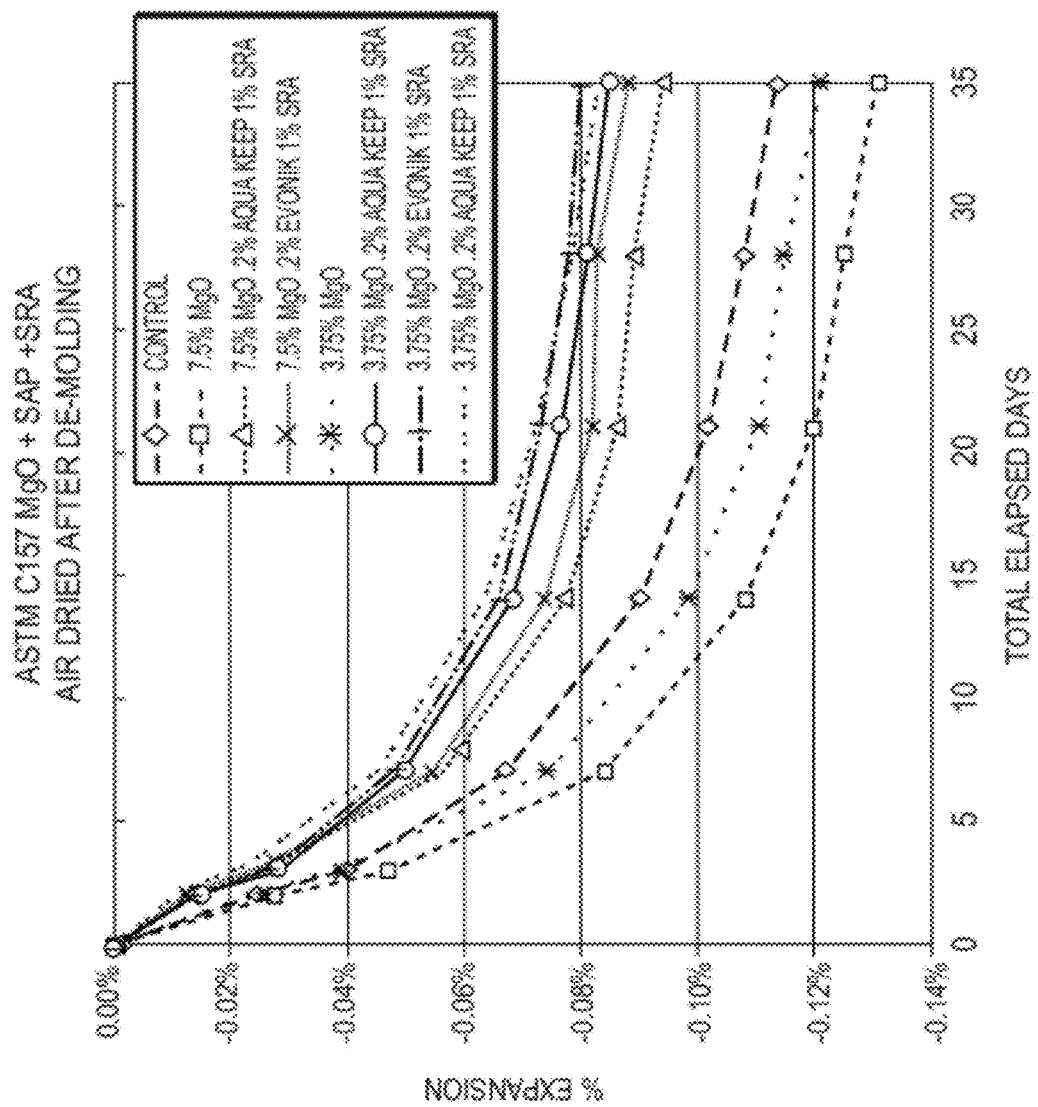
FIG. 10 is a graph showing drying shrinkage for mortars in Table 5.

After baseline data was generated from the three additives by themselves, an experiment was conducted to determine if combinations of MgO, SRA and SAP), which are used in embodiments of the present invention can demonstrate synergistic effects. Therefore, combination testing was run with the results as follows:

Table 5 shows the additional mixtures made with combinations of MgO/SRA/SAP in accordance with embodiments of the present invention. FIGS. 9 and 10 show the shrinkage data for the combination systems versus MgO alone, in moist curing then drying, and drying conditions without moist curing. In these cases comparing data to the other figures there is a benefit of having the SAP present, which was not expected based upon the data in FIGS. 7 and 8.

TABLE 5

Mortars with MgO with/without combinations of SRA/SAP, w/cm = 0.43, Cement:Sand = 1:2.6

| Mix # | MgO (%) | SAP (%) | SRA (%) |
|---|---|---|---|
| 1 (Ref.) | 0 | 0 | 0 |
| 2 | 7.5 | 0 | 0 |
| 6 | 7.5 | 0.2 (SAP#1) | 1 |
| 7 | 7.5 | 0.2 (SAP#2) | 1 |
| 8 | 3.75 | 0 | 0 |
| 12 | 3.75 | 0.2 (SAP #1) | 1 |
| 13 | 3.75 | 0.2 (SAP #2) | 1 |
| 17 (Rept#6) | 3.75 | 0.2 (SAP#1) | 1 |

Notes:
MgO—Premier 93HR, SAP#1—Aqua Keep, SAP#2—Evonik Agricultural, SRA—Commercial glycol based product. Rheobuild 1000 (NFS based) superplasticizer was used to adjust flow.

EXAMPLE 5

Figure 11:
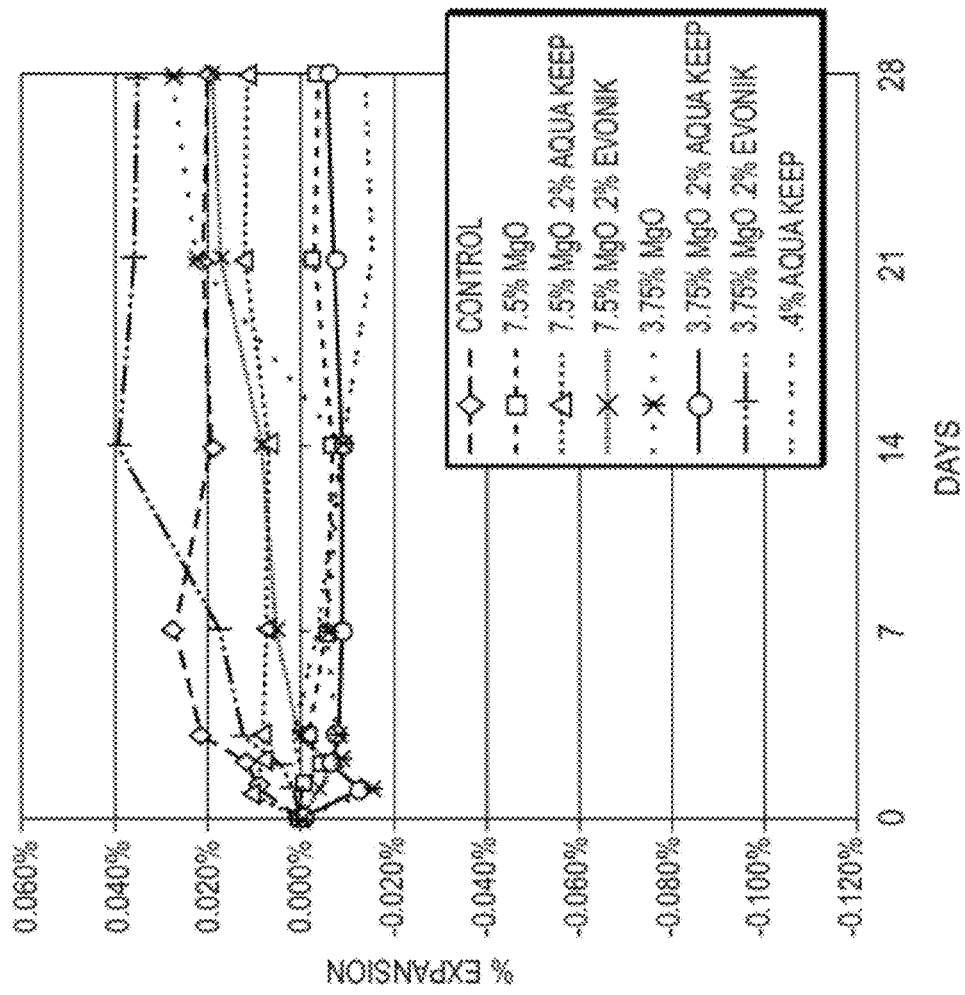
FIG. 11 is a graph showing autogenous shrinkage for mortars in Table 4.
Figure 12:
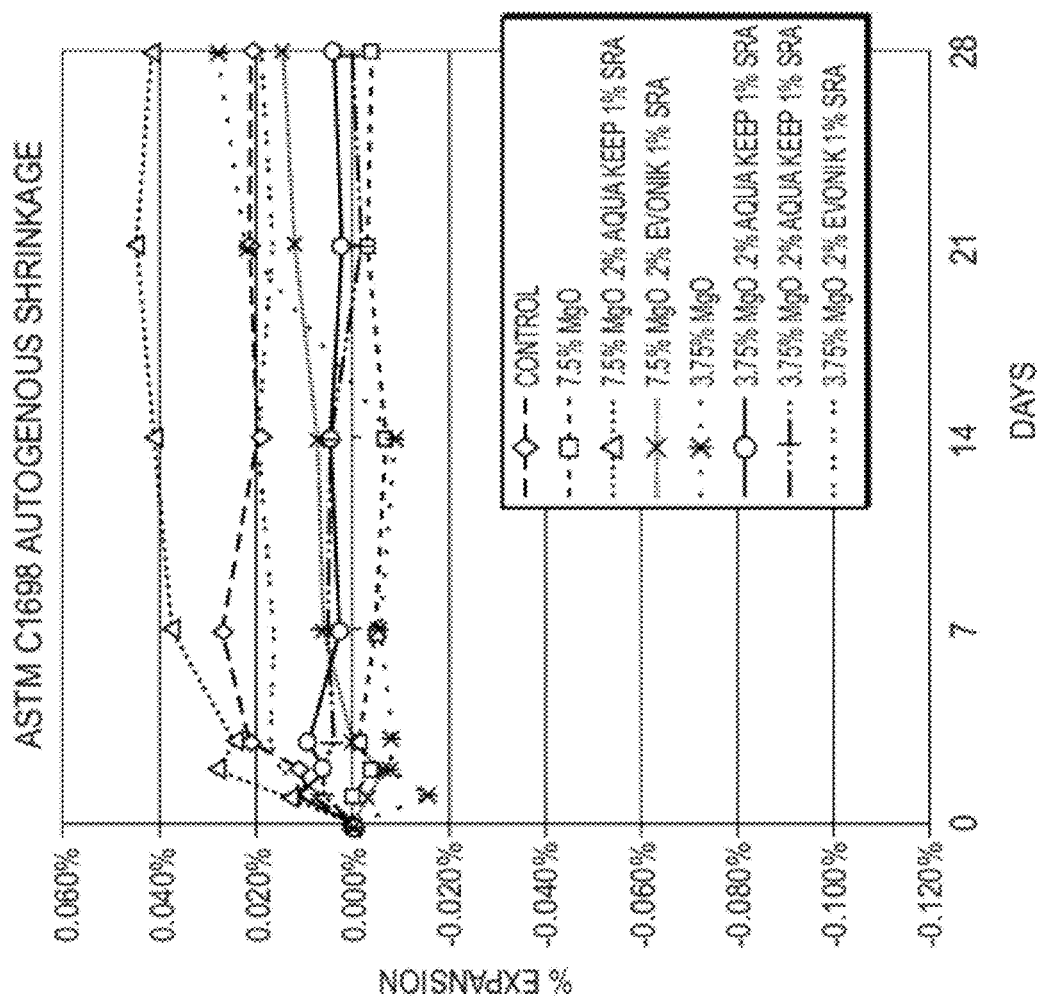
FIG. 12 is a graph showing autogenous shrinkage for mortars in Table 5.

FIG. 11 shows that there is a benefit to having an MgO/SAP combination for reducing autogenous shrinkage as measured in accordance with ASTM C 1698. More improved performance is obtained with the MgO/SRA/SAP invention combination as seen in FIG. 12.

The results from Examples 2-5 demonstrate the desired synergistic effects when MgO and SRA are used in combination and MgO, SRA and SAP are used in combination, especially in reducing autogenous shrinkage, which is a benefit of this invention. These results indicate that construction architects and engineers might be able to economically reduce the incidence of shrinkage cracking, autogenous shrinkage and longer term concrete cracking when using embodiments of the admixture of the present invention. These improved performances should also provide the ability to expand construction control joints from distances previously specified, to as much as 2 or 3 times the distance apart with reduced shrinkage cracking observation.

This synergistic combination of shrinkage control materials can be used for both crack reduction purposes and as supplemental cementing material. However, to make the materials of this invention easier to add, a single product is commercially desirable. A slurry product is hard to maintain so a dry product approach was pursued.

EXAMPLE 6

To demonstrate the advantage of the addition of MgO in accordance with the present invention over cement and fly ash of a similar particle size, experiments were conducted to determine at what point the powders with the dry component of MgO, cement, or fly ash, and the liquid addition of a SRA demonstrated significant clumping and what the packing behavior of the blended materials might be for material stored in bags under load. It was found that there was moderate clumping with the cement and SRA and this powder was slightly wet with 4.6% SRA of cement by mass. Small clumps occurred even at a low dosage of 2.8% SRA of cement, with 1.8% SRA of cement being the highest dosage that was a good dry powder. This indicates that all the cement should be treated that would be used for reduced drying shrinkage. This is not practical from a mixing point of view and would require a large space for specialty cement. Likewise the powder of fly ash and SRA only could get to a similar 1.8% SRA dosage of fly ash without clumping so it cannot be added at a high enough quantity to get good shrinkage reduction.

Figure 13:
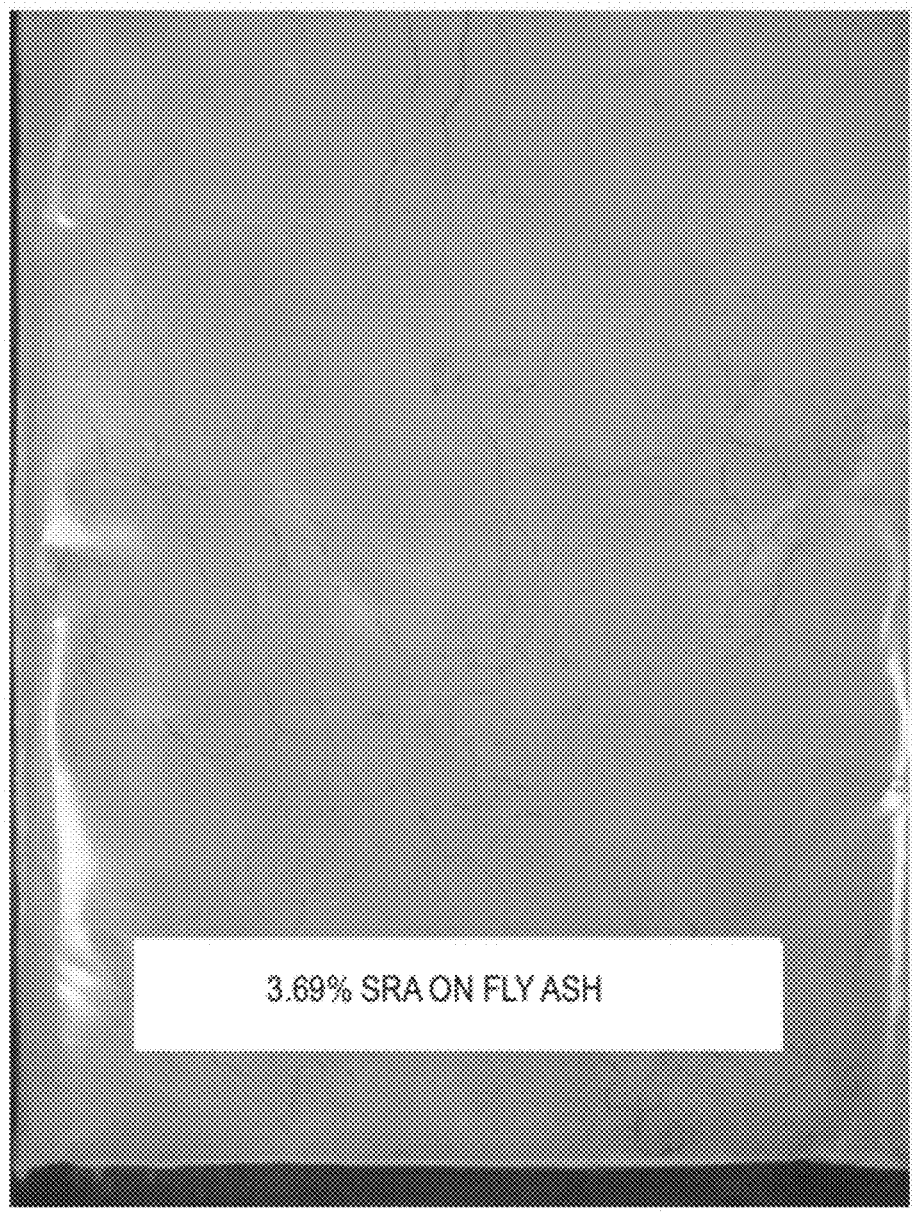
FIG. 13 illustrates powder of fly ash blended with SRA.
Figure 14:
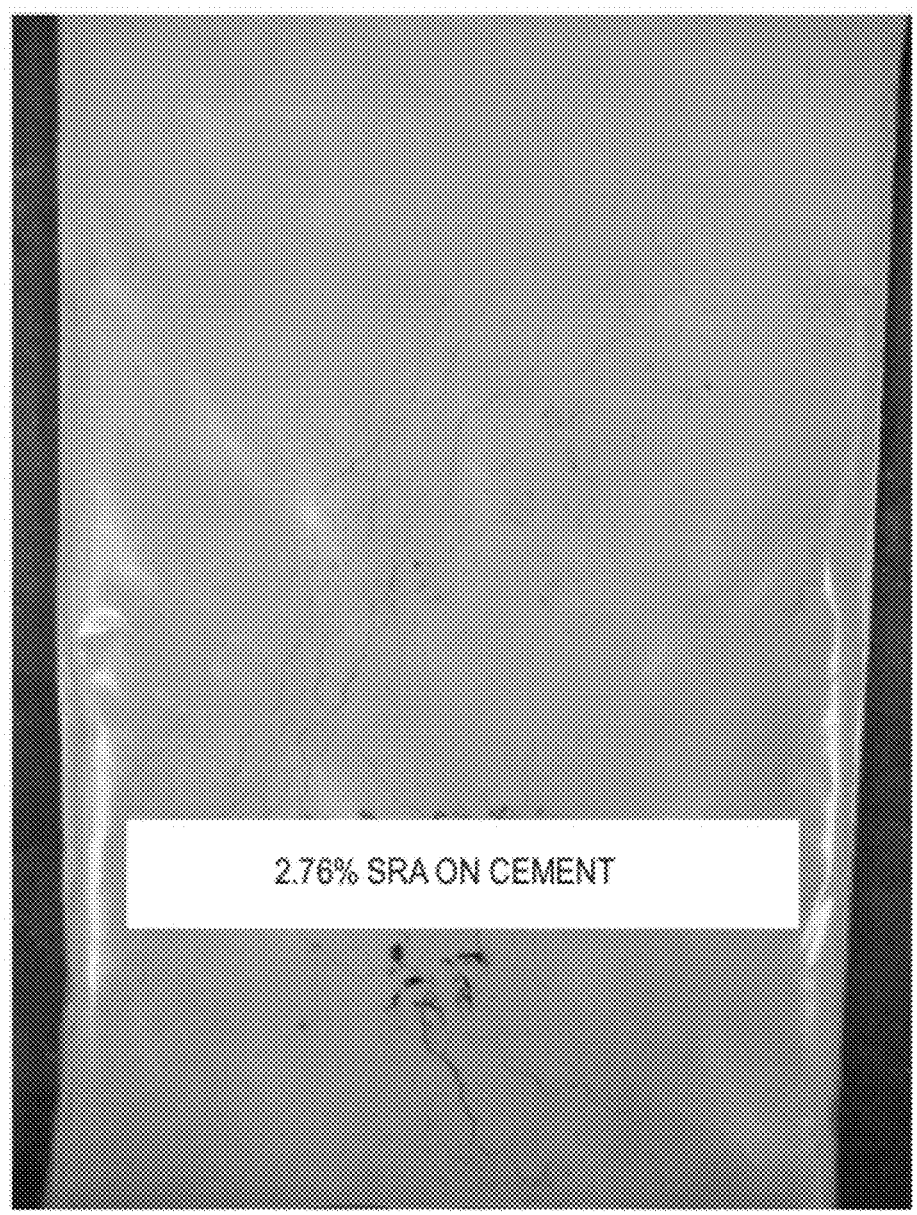
FIG. 14 illustrates powder of SRA with cement.
Figure 15:
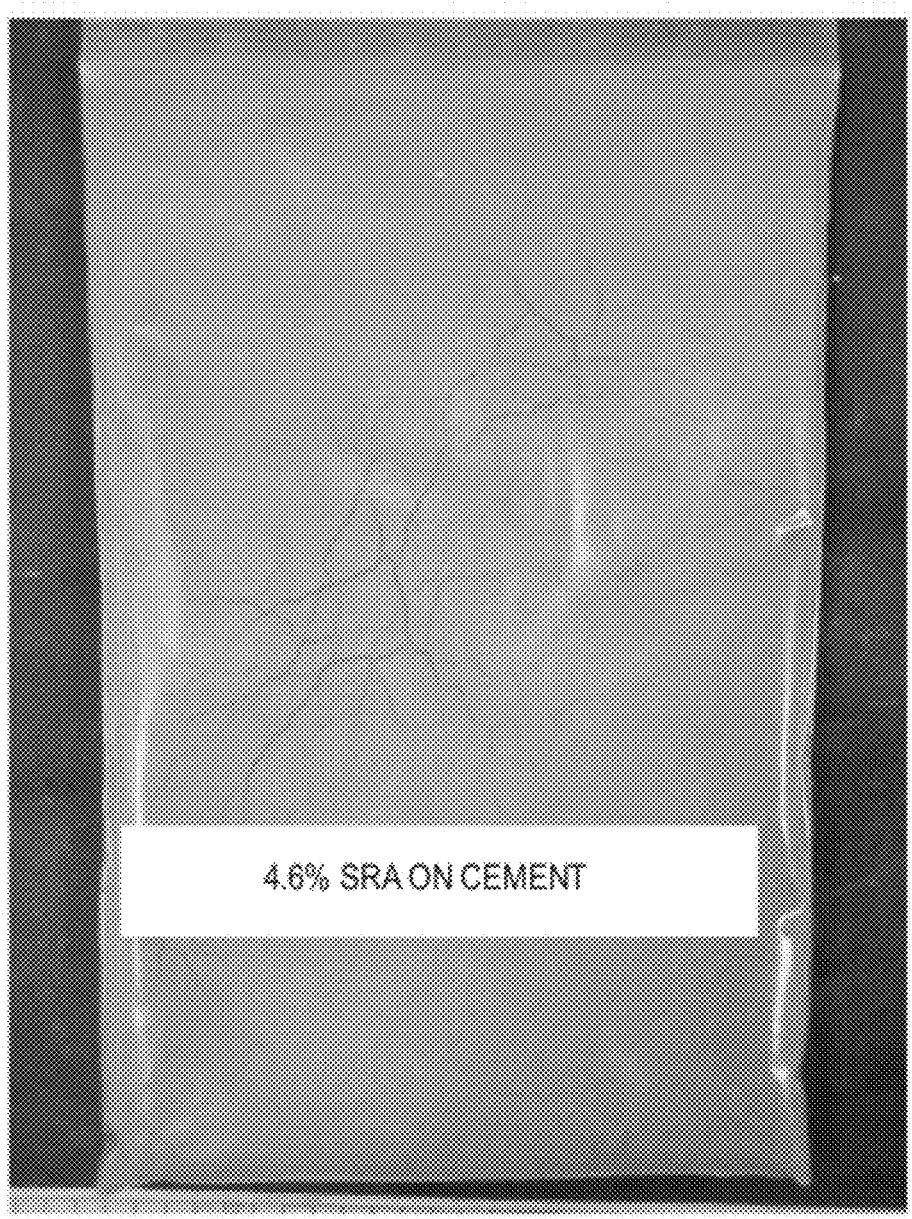
FIG. 15 illustrates powder of SRA with cement showing significant mud like crack pattern at higher SRA level.
Figure 16:
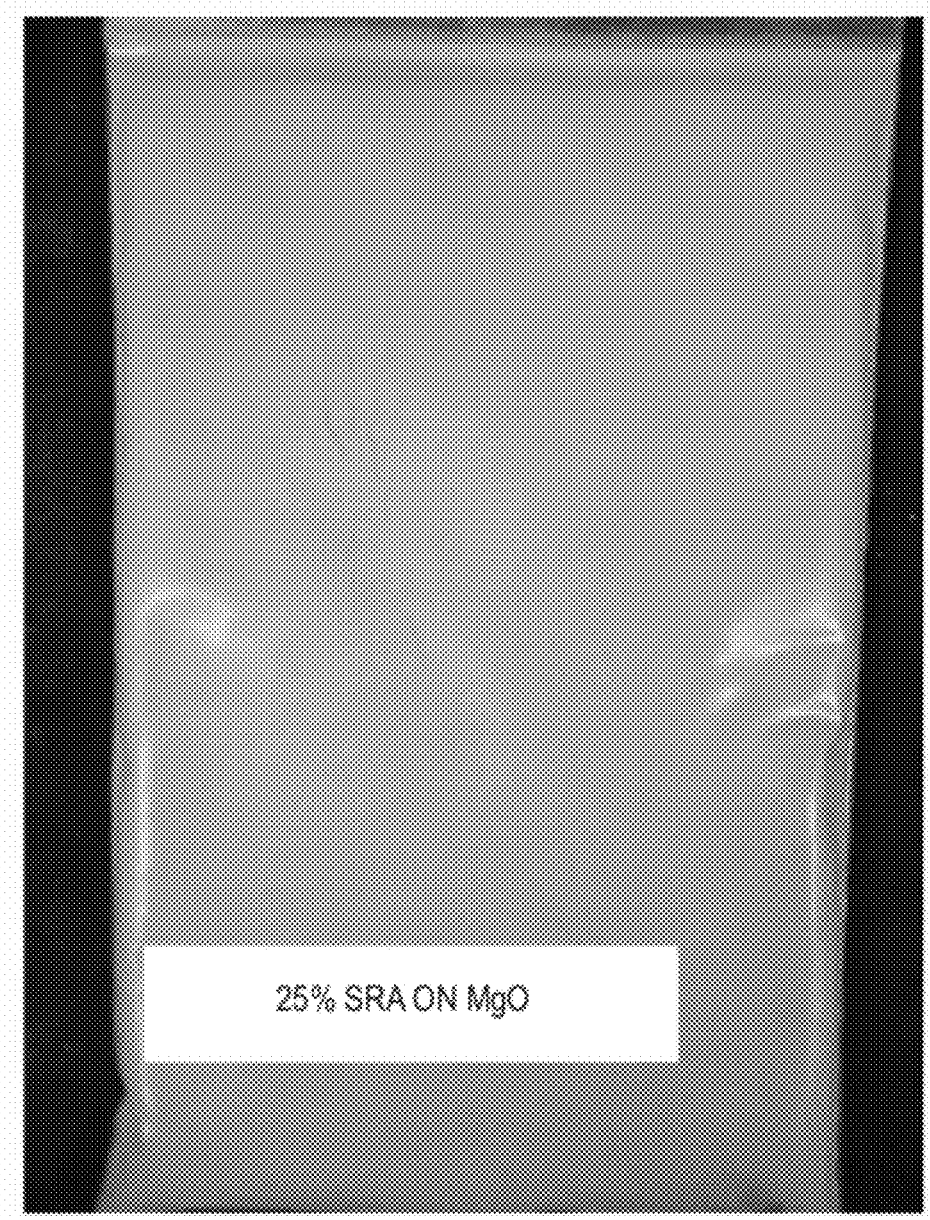
FIG. 16 illustrates MgO powder at high SRA content with only minor crack pattern.
Figure 17:
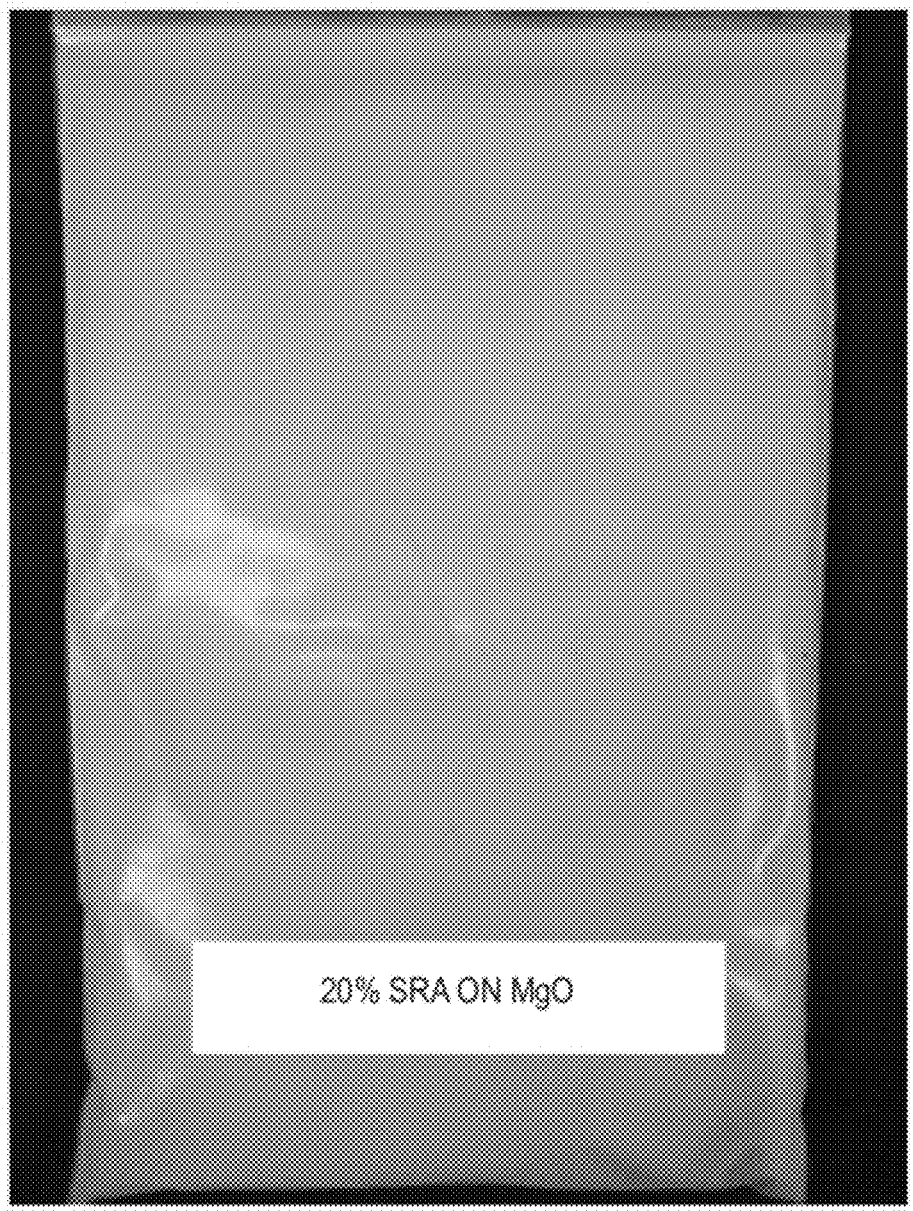
FIG. 17 illustrates MgO powder at high SRA content and no crack pattern.
Figure 18:
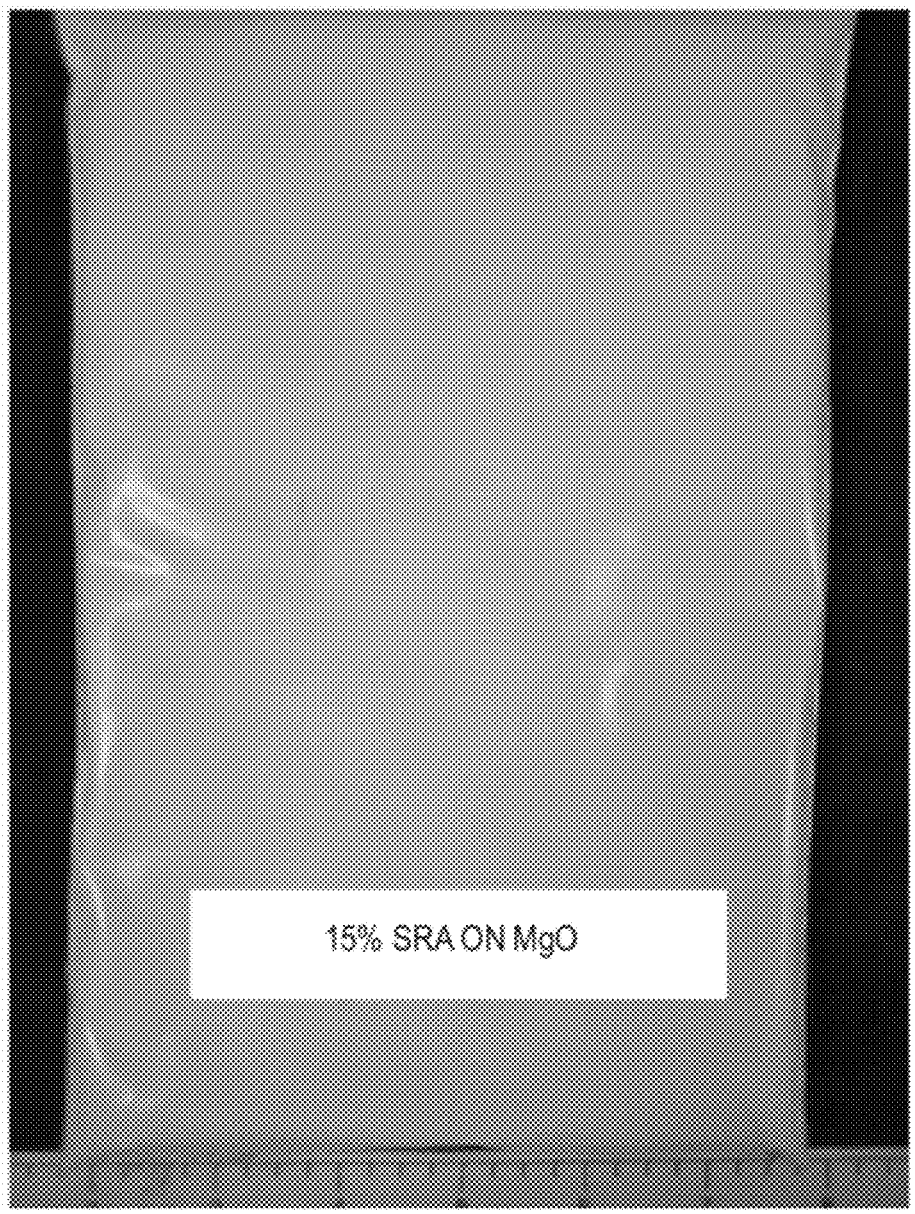
FIG. 18 illustrates MgO powder with moderate SRA content and no cracking.
Figure 19:
FIG. 19 illustrates MgO powder with low SRA content and no cracking.
Figure 20:
FIG. 20 illustrates powder of MgO with SRA showing no cracking pattern.

Packing tests results are shown in FIGS. 13-20. These tests consisted of sealing the powder blends of cement and SRA, fly ash and SRA, or MgO and SRA in plastic bags, and then applying a weight to the bags to simulate typical storage conditions of the products on pallets or shelves. The fly ash and cement and SRA powders were put into the bags at the highest levels of SRA addition where there was mild clumping. Referring to FIGS. 13-15, note that there is a cracked mud like appearance which is indicative of the SRA being above an amount that is absorbed by the materials for the cement and fly ash specimens. In contrast only the very highest percentages of SRA with MgO showed only a slight cracking. In addition the MgO/SRA blends are white, which is a benefit for several architectural applications.

TABLE 6

Evaporation data for thin powder samples exposed to air in a fume hood for 72 hours.

| Sample # | Carrier Powder | % SRA on Powder | % Mass Change | % Mass of SRA lost |
|---|---|---|---|---|
| 1 | Fly ash | 3.69 | −2.15 | 60.0 |
| 2 | Portland Cement | 2.76 | −1.12 | 42.9 |
| 3 | Portland Cement | 4.60 | −1.36 | 30.8 |
| 4 | MgO | 25.0 | +0.36 | — |
| 5 | MgO | 20.0 | +0.95 | — |
| 6 | MgO | 15.0 | +1.62 | — |
| 7 | MgO | 13.4 | +1.22 | — |
| 8 | MgO | 17.5 | +1.70 | — |

Note all mass loss is assumed to be evaporation of SRA as only volatile substance in powder.

Table 6 shows evaporation data for 5 to 6 g of powder placed in a Petri dish of about 6.3 mm diameter to have about 2 mm of powder exposed to air for 72 hours. The MgO/SRA specimens gained a small amount of mass (typically under 2%), whereas, the cement/SRA and fly ash/SRA samples lost mass. The gain in mass is most likely due to some minor reactions with moisture in the air due to the high area of the sample that was exposed, and shows there is no loss of SRA. In contrast both the cement and fly ash powders lost mass. The only component that is volatile enough to leave is the SRA. The loss in mass would for the cement case indicate that it is losing more SRA than it gains in water mass from surface hydration, and the fly ash would be losing SRA at a higher rate (over 2% of the mass). The lower addition amounts for the cement and fly ash blends means that the actual loss of SRA is even much higher with numbers exceeding 30% of the initial amount of SRA added to the fly ash or cement, in the best case where clumping was observed. Thus the cement and fly ash carriers in addition to being impractical for the amount of SRA they could provide, would be likely to quickly lose a large amount of the SRA unless very tightly sealed. The data for the dry powder in accordance with embodiments of the present invention are consistent with the SRA being absorbed into the higher surface porosity of the MgO, which in addition to making it possible to have a higher addition rate of SRA, makes the powder more stable. In actual sealed storage bags the mass gain would be minimal because the exposure of the powder to air would be minimal.

Drying shrinkage is reduced as the water-to-cementitious ratio decreases so a preferred use of embodiments of the present invention includes superplasticizers and water reducers. In addition, the production of high performance concrete using embodiments of the present invention should preferably use superplasticizers.

EXAMPLE 7

Table 7 provides exemplary concrete mixture design and performance data for typical structural concrete for which low shrinkage performance is desired. The data show that powders in accordance with embodiments of the present invention when used as a cement replacement have very close plastic concrete properties to a control mixture using the same admixture dosages, except for a higher amount of air entrainer, which is still at a low addition rate. Early strengths are slightly reduced, but all were above 5000 psi at 7 days, and this is typical of a 28 day minimum strength requirement. The performance is in line with that of pozzolans that offer no advantage, or are detrimental to shrinkage.

TABLE 7

Concrete properties of mixtures with and without MgO/SRA powder

| | Sample ID | | | |
|---|---|---|---|---|
| | 1C | 1-3.75 | 1-6 | 1-6-12 |
| | Mix Type | | | |
| Materials | 1C Control lb/yd³ | 3.75% Magox/ SRA lb/yd³ | 6% Magox/ SRA lb/yd³ | 6% Magox/ SRA lb/yd³ |
| Portland Cement I/II | 588 | 566 | 553 | 553 |
| Magox MgO/SRA 5.5:1 | 0 | 26 | 42 | 0 |
| Magox MgO/SRA 12:1 | 0 | 0 | 0 | 38 |
| Concrete Sand | 1240 | 1231 | 1238 | 1241 |
| Coarse Agg. #67 | 1736 | 1736 | 1736 | 1736 |
| Water lbs/yd³ | 256 | 256 | 256 | 256 |
| Design Air % | 6.00 | 6.00 | 6.00 | 6.00 |
| MBAE-10 Air Ent. Admix oz/cwt | 0.4 | 0.8 | 0.75 | 0.85 |
| 300R Retarder oz/cwt | 3 | 3 | 3 | 3 |
| Polyheed 997 Midrange oz/cwt | 3 | 3 | 3 | 3 |
| Rheobuild 1000 HRWR oz/cwt | 1.4 | 1.4 | 1.4 | 1.4 |
| Total lb/yd³ | 3820 | 3815 | 3825 | 3824 |
| W/C Ratio (As Tested) | 0.43 | 0.43 | 0.43 | 0.43 |
| Slump in. | 4.00 | 3.50 | 4.00 | 4.00 |
| Air % (As Tested) | 6.60 | 6.60 | 6.10 | 7.30 |
| Density lb/ft³ | 140.9 | 140.8 | 141.1 | 139.0 |
| Days | Compressive Strength (PSI) | | | |
| 3 | 4885 | 4760 | 4645 | 4675 |
| 7 | 5605 | 5495 | 5210 | 5330 |

Notes:
1-3.75, and 1-6 are at 5.5:1 MgO:SRA by mass. 3.75 represents percent MgO on cement. The 1-6-12 is a 12:1 MgO:SRA by mass. The 6 represents 6% MgO by mass on cement.

Figure 21:
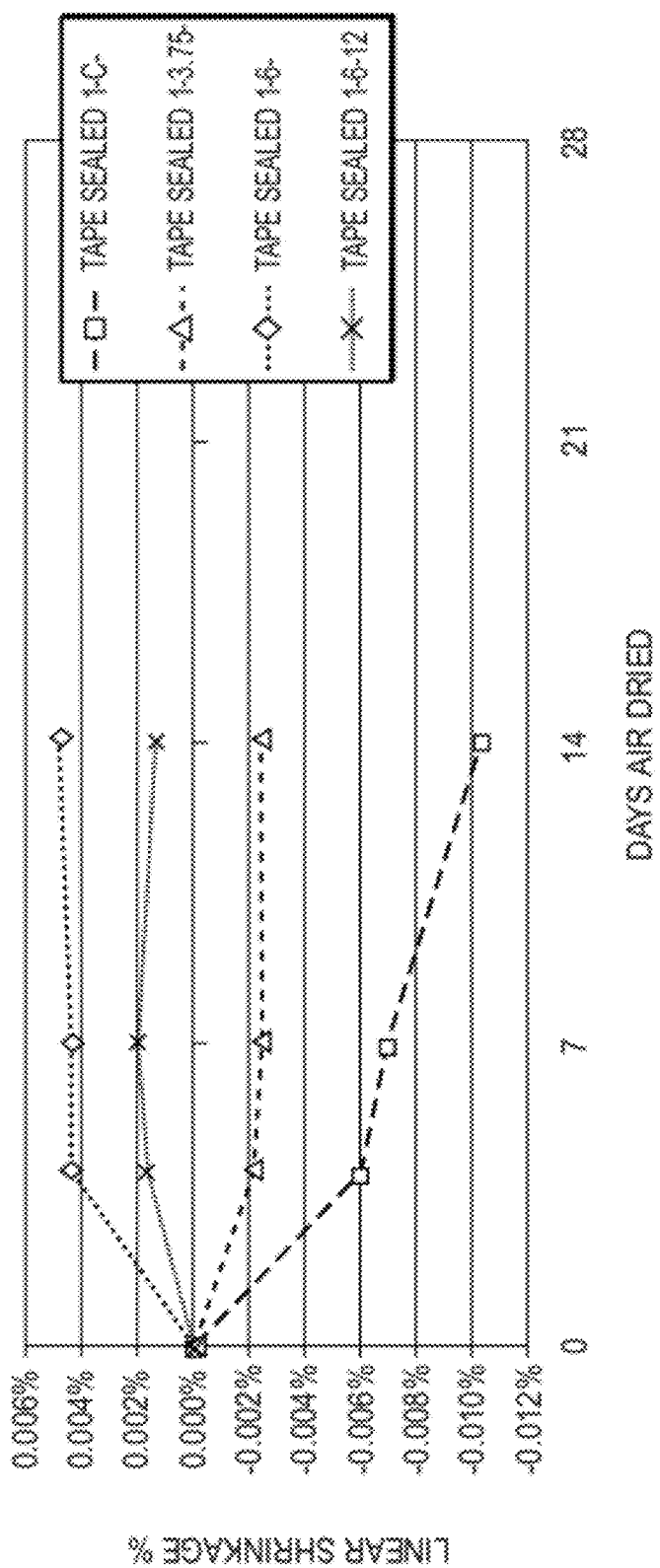
FIG. 21 is a graph showing drying shrinkage for concrete specimens sealed with tape.
Figure 22:
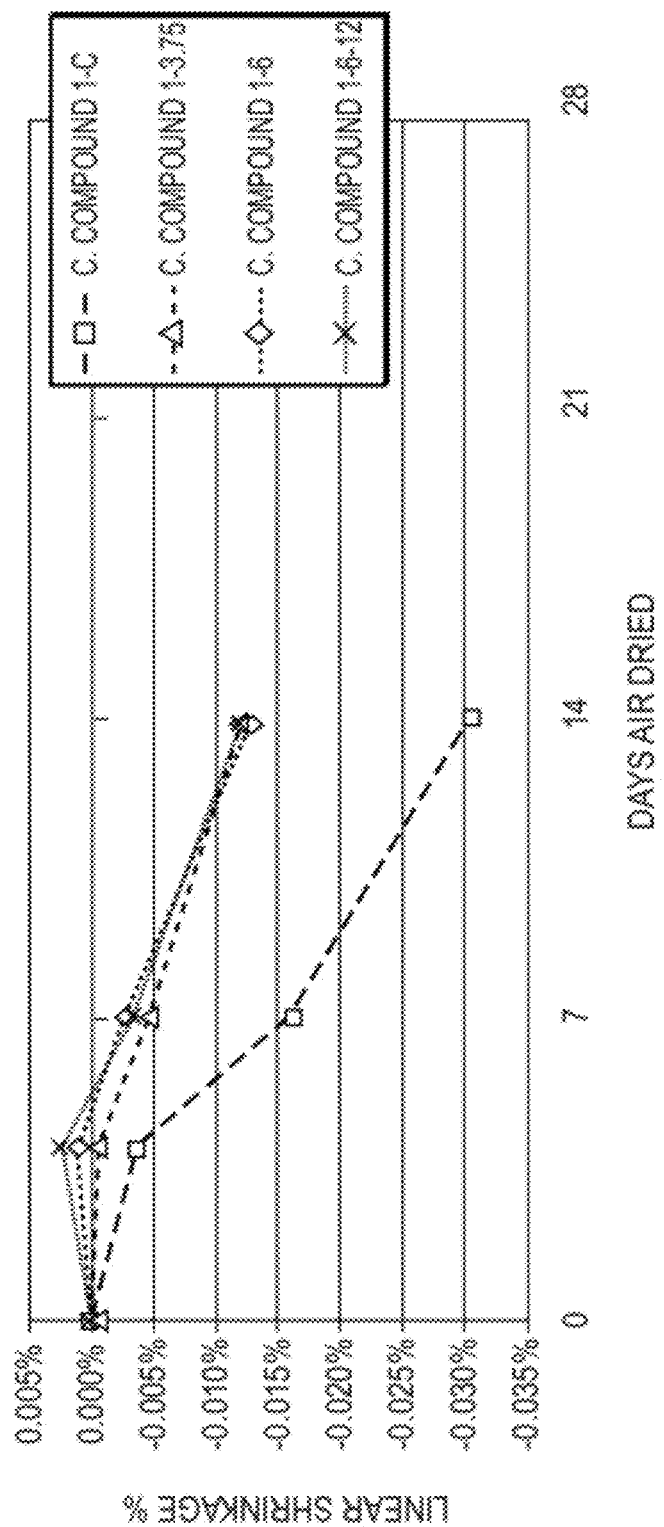
FIG. 22 is a graph showing drying shrinkage for concrete specimens sealed with a curing compound.

FIGS. 21-22 show the drying shrinkage for specimens that were sealed with tape or sealed with a commercial non aqueous concrete curing compound. The control and two of the powder additions of the invention had less shrinkage when the samples were sealed with an aluminum tape. This would be expected as the aluminum tape would provide a better protection against moisture loss or moisture ingress. However, the embodiment of the present invention MgO/SRA powder at the 5.5 to 1.0 MgO to SRA ratio at 6% MgO and 1.09% SRA on cementitious had approximately 2.5 times the expansion, when sealed with a curing compound, at 7 days compared to its taped counterpart. This is a significant improvement as curing compound sealers are very common in the field. In addition, the expansion levels off and decreases a little which is ideal behavior to avoid possible cracking from expansion.

The data in FIG. 22 for the curing compounds show shrinkage reduction percentages of over 75% for embodiments of the present invention using MgO/SRA combinations. To achieve this level of early shrinkage reduction over the control samples typically over 1.5% SRA by mass of cement is needed. The examples here accomplish this with SRA levels under 0.7% and at a higher 1% SRA level still show early expansion, without water curing. This approach is less costly than using a SRA alone, and mitigates potential problems in meeting air entrainment requirements. The partial replacement of cement with MgO lowers the carbon footprint of the concrete, as does the use of embodiments of the present invention with the potential to reduce crack-induced durability reductions in performance.

Figure 23:
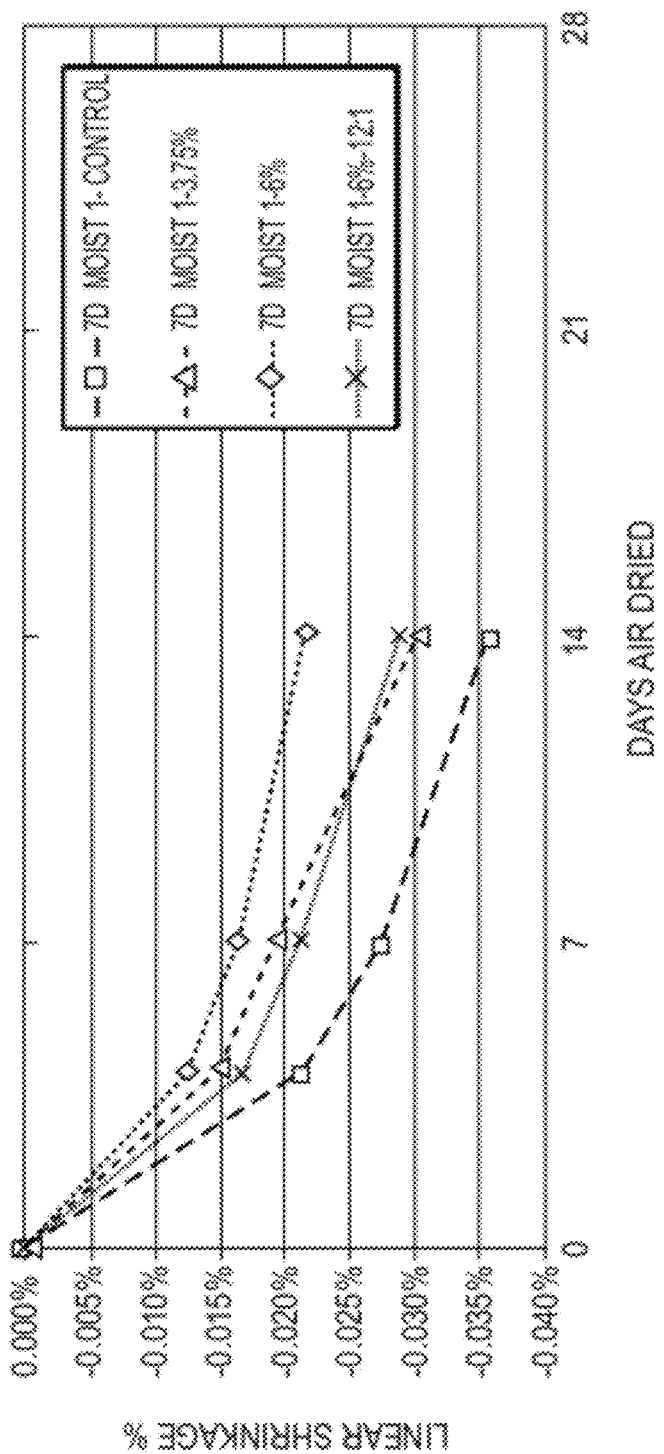
FIG. 23 is a graph showing drying shrinkage for concrete specimens that were wet cured for 7 days.

FIG. 23 shows the drying shrinkage results for concretes that were moist cured for 7 days before the initiation of drying shrinkage. Even without including the higher expansion taking place for embodiments of the present invention using MgO/SRA specimens under moist curing, there is still a significant reduction in drying shrinkage for the MgO/SRA specimens. In actual exposure conditions the initial expansion will reduce early tensile stresses so the benefits are greater than what is shown.

EXAMPLE 8

Additional testing was performed on mortars that would be typical of those used in repair applications. Table 8 provides the mortar data for vertical and overhead repair mortars with and without embodiments of the present invention using MgO/SRA powder at 5.5:1 ratio at two different dosage rates. Table 9 provides data for a latex mortar with and without similar dosages of embodiments of the present invention using MgO/SRA powder at the 5.5:1 ratio.

TABLE 8

Mortar properties for Overhead and Vertical Mortars with and without MgO/SRA at 5.5:1 Mass Ratio.

| Mixture | w/c | Flow | Compressive Strength 1 day (psi) | Compressive Strength 7 days (psi) |
|---|---|---|---|---|
| Control | 0.369 | 88 | 2116 | 5248 |
| 3% MgO/SRA | 0.367 | 88 | 2085 | 4850 |
| 6% MgO/SRA | 0.365 | 79 | 1573 | 4038 |

Total powder mass 49.24 lbs. per batch, MgO/SRA added as cement replacement.
Note the mortar mix contained 50.5% sand by mass of the powder. Air content was 4%.

TABLE 9

Mortar properties for ASTM C 1439 10% dry latex mortars (with defoamer) with and without MgO/SRA at 5.5:1 Mass Ratio.

| Mixture | Flow | % Air | Compressive Strength 1 day (psi) | Compressive Strength 7 days (psi) |
|---|---|---|---|---|
| Control | 107 | 9 | 829 | 3909 |
| 3% MgO/SRA | 108 | 8 | 693 | 3476 |
| 6% MgO/SRA | 104 | 8 | 505 | 2901 |

Cement to sand was 1 to 2.75 and w/cm = 0.457.

In addition to the normal mortar properties in Tables 8 and 9, the shrinkage properties were determined as they are one of the major properties affecting cracking of the mortars under restrained conditions. Drying shrinkage is of the most concern as these mortars are often used in restrained conditions in which they will be subjected to drying. However, due to having an expansive component, data showing that expansion would be less than 0.1% in 14 days is beneficial to show that cracking due to internal expansion is not likely. In the exemplary tests, 0.1% value was chosen as a value that is the upper limit for expansion in mortar testing for aggregates susceptible to expansive reactions.

Figure 24:
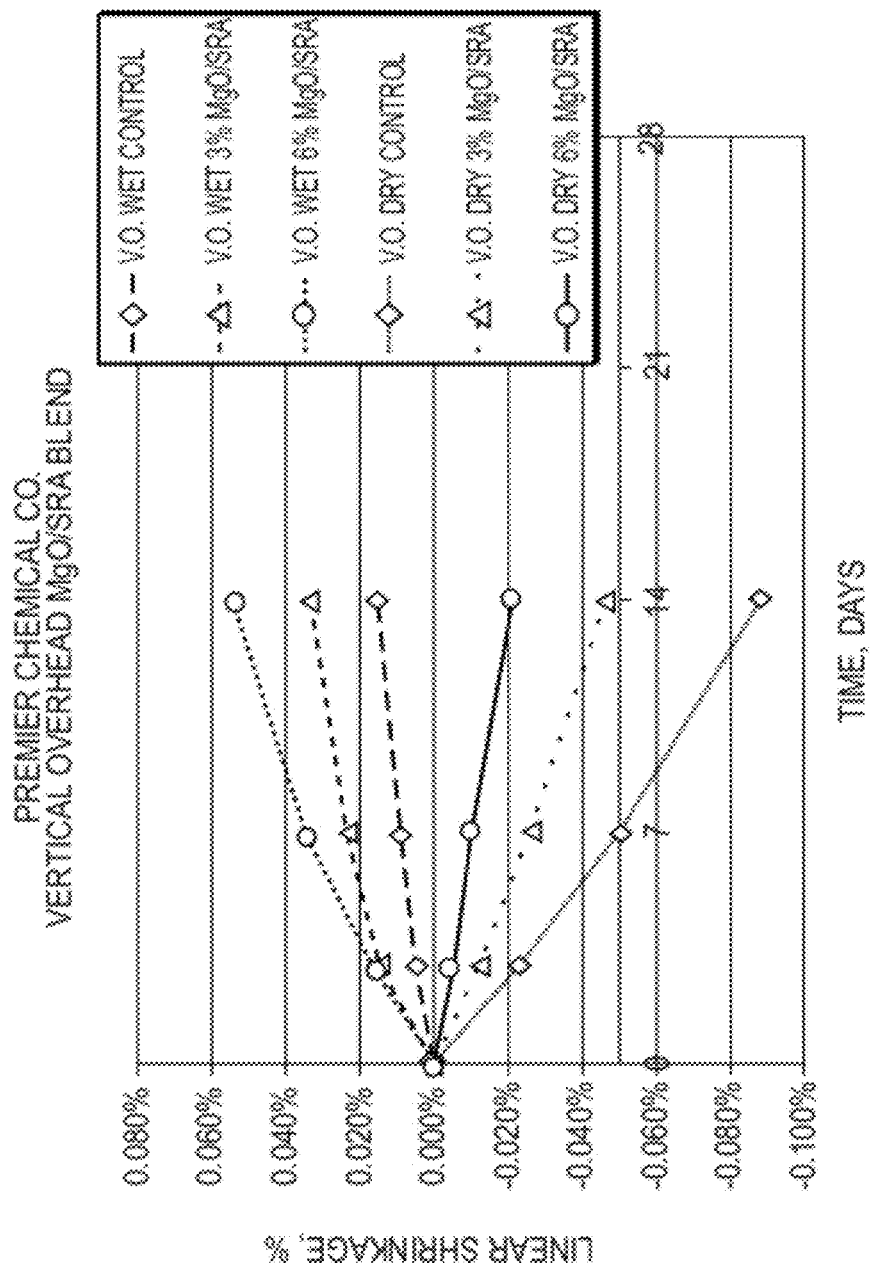
FIG. 24 is a graph showing shrinkage under air drying and constant immersion in water for an overhead and vertical repair mortar, with positive numbers indicating expansion.

FIG. 24 shows both the expansion in water and shrinkage in air for the overhead and vertical repair mortars. Mortars made in accordance with embodiments of the present invention show more expansion than the control, but below the critical value at which cracking due to expansion becomes a potential concern. The drying shrinkage is substantially reduced for the two mortars made in accordance with embodiments of the present invention. This will make these mortars more resistant to cracking.

Figure 25:
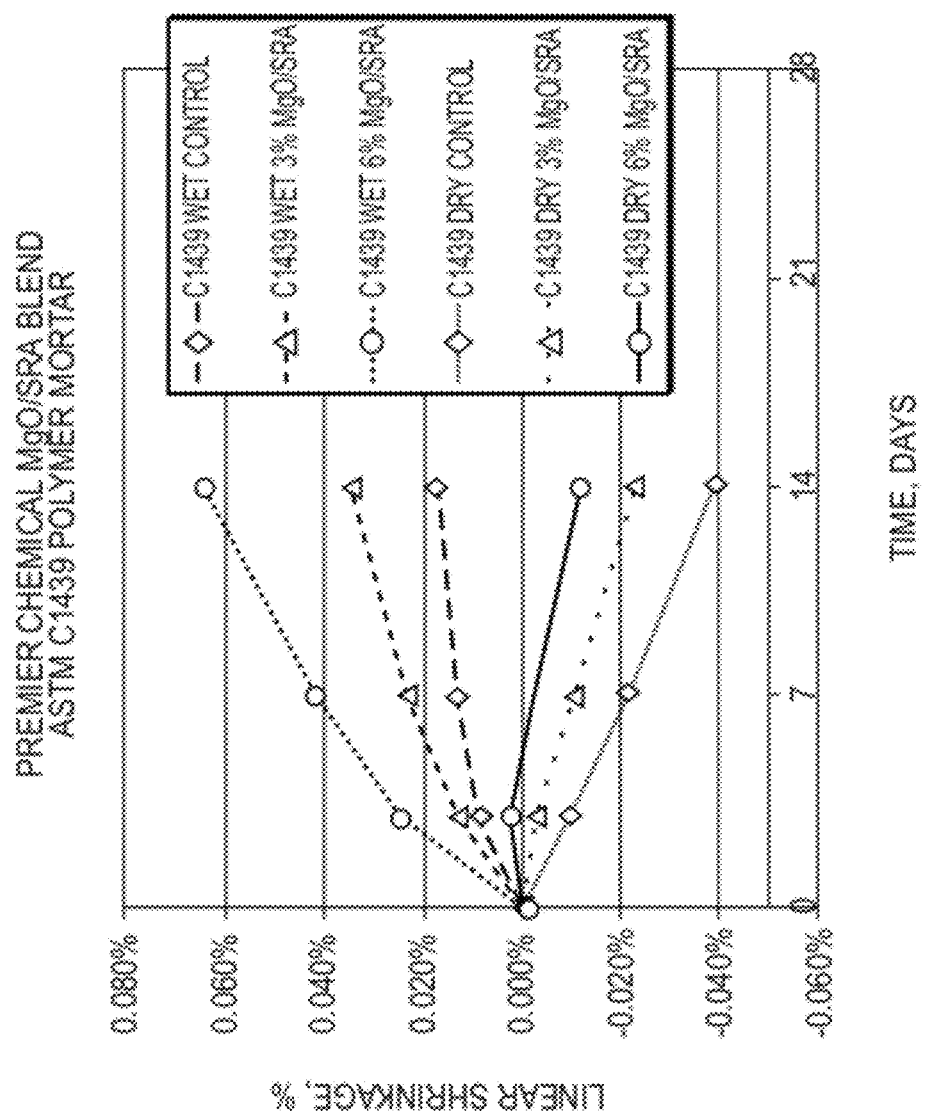
FIG. 25 is a graph showing shrinkage under air drying and constant immersion in water for a latex modified mortar, with mixture proportions according to ASTM C 1439, with positive numbers indicating expansion.

FIG. 25 shows both the expansion in water and shrinkage in air for the ASTM C 1439 mortar series. Embodiments of the present invention mortars show more expansion in water as expected, but are still below the critical expansion limit. The drying shrinkage is substantially reduced with embodiments of the present invention mortars, and this too should result in making them more resistant to cracking.

To get to the low drying shrinkage values obtained in accordance with embodiments of the present invention, one would need a much higher dosage of MgO or SRA alone (1.5 to 2 times higher than used in combination). In the case of the MgO, expansion under moist conditions could in some cases be excessive, whereas the SRA alone is much more expensive and can have negative effects on several concrete properties such as strength, setting times, and air entrainment.

The improved shrinkage resistance in the beam tests resulted in large increases in the time to cracking in a restrained shrinkage ring test, ASTM C 1551. Table 10 shows the time to cracking and strain at the time of cracking for the overhead and vertical repair mortar mixtures as well as the C 1439 mortar. Clearly the mortars embodying the present invention are far superior to the control mortars. For the C 1439 mortar series the average stress rate was determined.

TABLE 10

ASTM C 1551 Restrained Shrinkage Ring results for overhead and vertical mortars and C 1439 mortars.

| Mortar Mixture | Average Time to Fail (days) | Microstrain at Failure | Average Strain Rate Factor (microstrain/days$^{-0.5}$) | Average Stress Rate (psi/day) |
|---|---|---|---|---|
| OH/Vertical Control | 1.6 | −45 | | |
| OH/Vertical 3% MgO/SRA | 4.4 | −39 | | |
| OH/Vertical 6% MgO/SRA | 12.0 | −33 | | |
| C 1439 Control | 15.3 | −47 | 26 | 27 |
| C 1439 3% MgO/SRA | >15.3 | −25* | 12 | 12 |
| C 1439 6% MgO/SRA | >15.3 | −6.4* | 7.2 | 6.2 |

*At 15.3 days of testing, samples had not failed at that time.

There was a substantial decrease in the stress development with the addition of the MgO/SRA powder. The C 1439 mortar cracked at 15 days which is very close to where the test method would have predicted its failure based on an average stress rate of 27 psi/day, it would be rated as having a moderate potential for cracking. The low addition of the invention MgO/SRA had a stress rate at that point of 12 psi/day, which put it in the low potential for cracking range. The higher addition of MgO/SRA according to this invention had a very low stress rate of 6.4 psi/day. The potential for cracking for this mortar is very low.

The invention claimed is:

1. A dry, flowable-powder consisting essentially of:
   magnesium oxide including a light calcined material calcined at temperatures ranging from approximately 750° C. to approximately 1,200° C.; and a shrinkage reduction agent, the shrinkage reduction agent including at least one of:

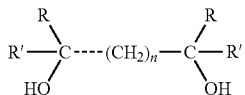

wherein each R independently includes one of a hydrogen atom and a $C_1$ to $C_2$ alkyl, each R' independently includes a $C_1$ to $C_2$ alkyl, and n is an integer from 1 to 2; and $HO(AO)_xH$, wherein A is one of methylene, ethylene, and propylene, and x is an integer from 1 to 10.

2. A dry, flowable-powder consisting essentially of:
magnesium oxide including a light calcined material calcined at temperatures ranging from approximately 750° C. to approximately 1,200° C.;
a shrinkage reduction agent, the shrinkage reduction agent including at least one of:

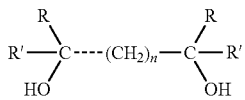

wherein each R independently includes one of a hydrogen atom and a $C_1$ to C2 alkyl, each R' independently includes a C1 to C2 alkyl, and n is an integer from 1 to 2; and
HO(AO)xH, wherein A is one of methylene, ethylene, and propylene, and x is an integer from 1 to 1; and
a super absorbent polymer including a polyacrylic and polyacrylamide copolymer.

3. The dry, flowable-powder according to claim 2, wherein the superabsorbent polymer includes one or more of a crosslinked acrylic-acrylamide copolymer neutralized with potassium, or magnesium.

4. The dry, flowable-powder according to claim 1, wherein the shrinkage reduction agent includes a liquid shrinkage reduction admixture.

5. The dry, flowable-powder according to claim 4, wherein the liquid shrinkage reduction agent is combined with the magnesium oxide to form the dry, flowable powder.

6. The dry, flowable-powder according to claim 1, wherein the magnesium oxide has a mean particle size in the range of between approximately 10 to approximately 20 micrometers.

7. The dry, flowable-powder according to claim 1, further comprising an early-age desiccation additives including one or more of a calcium stearate, a butyl stearate, polymer stearate, a potassium methyl siliconate and an organo-silicone derivative.

8. The dry, flowable-powder according to claim 2, wherein the super absorbent polymer includes particles having varying particle sizes ranging from approximately 75 to approximately 2000 µm.

9. The dry, flowable-powder according to claim 1, further comprising one or more of calcium oxide, calcium silicate, magnesium silicate.

10. The dry, flowable-powder according to claim 1, further comprising one or more of a polycarboxylate derivative, a sulfonated melamine-formaldehyde condensate, a sulfonated naphthalene-formaldehyde condensate, and a modified lignosulfonate.

11. The dry, flowable-powder according to claim 1, wherein the shrinkage reduction agent is included in the range of approximately 7% to approximately 30% of the magnesium oxide by mass.

12. The dry, flowable-powder according to claim 1, wherein the shrinkage reduction agent is included in the range of approximately 13% to approximately 25% by mass of the magnesium oxide.

13. The dry, flowable-powder according to claim 1, wherein the shrinkage reduction agent is included in the range of approximately 17.5% to approximately 25% by mass of the magnesium oxide.

14. The dry, flowable-powder according to claim 1, wherein the shrinkage reduction agent is included in the range of approximately 0.1% to approximately 7% by mass of magnesium oxide.

15. A dry, flowable-powder consisting essentially of:
magnesium oxide including a light calcined material calcined at temperatures ranging from approximately 750° C. to approximately 1,200° C.;
a shrinkage reduction agent, the shrinkage reduction agent including at least one of:

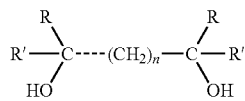

wherein each R independently includes one of a hydrogen atom and a C1 to C2 alkyl, each R' independently includes a C1 to C2 alkyl, and n is an integer from 1 to 2; and
HO(AO)xH, wherein A is one of methylene, ethylene, and propylene, and x is an integer from 1 to 10; and
portland cement.

16. A dry, flowable-powder consisting essentially of:
magnesium oxide including a light calcined material calcined at temperatures ranging from approximately 750° C. to approximately 1,200° C.;
a shrinkage reduction agent, the shrinkage reduction agent including at least one of:

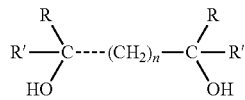

wherein each R independently includes one of a hydrogen atom and a C1 to C2 alkyl, each R' independently includes a C1 to C2 alkyl, and n is an integer from 1 to 2; and
HO(AO)xH, wherein A is one of methylene, ethylene, and propylene, and
x is an integer from 1 to 10;
a super absorbent polymer including a polyacrylic and polyacrylamide copolymer; and
portland cement.

17. The dry flowable-powder according to claim 15, wherein the magnesium oxide is included in the range of between approximately 3% and approximately 7.5% relative to the portland cement, and the shrinkage reduction agent is included in the range of between approximately 0.5% and approximately 2% relative to the Portland cement.

18. The dry flowable-powder according to claim 15, wherein the magnesium oxide is included in the range of between approximately 3.75% and approximately 6% relative to the portland cement, and the shrinkage reduction agent is included in the range of between approximately 0.5% and approximately 1.75% relative to the Portland cement.

* * * * *